US008170345B2

(12) United States Patent
Morita

(10) Patent No.: US 8,170,345 B2
(45) Date of Patent: May 1, 2012

(54) IMAGING SYSTEM, IMAGE PROCESSING METHOD, AND IMAGE PROCESSING PROGRAM

(75) Inventor: Yasunori Morita, Tokyo (JP)

(73) Assignee: Olympus Corporation, Tokyo (JP)

(*) Notice: Subject to any disclaimer, the term of this patent is extended or adjusted under 35 U.S.C. 154(b) by 440 days.

(21) Appl. No.: 12/487,936

(22) Filed: Jun. 19, 2009

(65) Prior Publication Data
US 2009/0324089 A1 Dec. 31, 2009

(30) Foreign Application Priority Data

Jun. 26, 2008 (JP) ................... 2008-167864

(51) Int. Cl.
G06K 9/40 (2006.01)
G06K 9/46 (2006.01)

(52) U.S. Cl. ............ 382/195; 382/275; 382/254
(58) Field of Classification Search .......... 382/100, 382/195, 254, 275; 375/240.29
See application file for complete search history.

(56) References Cited

U.S. PATENT DOCUMENTS

| | | | | |
|---|---|---|---|---|
| 6,307,888 B1* | 10/2001 | Le Clerc | ........... | 375/240.29 |
| 7,738,042 B2* | 6/2010 | Kamimura | ........... | 348/607 |
| 7,983,501 B2* | 7/2011 | Chiu | ........... | 382/254 |
| 8,023,762 B2* | 9/2011 | Rhee | ........... | 382/260 |
| 2005/0105627 A1* | 5/2005 | Sun et al. | ........... | 375/240.29 |

FOREIGN PATENT DOCUMENTS

| | | |
|---|---|---|
| JP | 06-062283 A | 3/1994 |
| JP | 09-081754 A | 3/1997 |
| JP | 2002-033942 A | 1/2002 |
| JP | 2003-219208 A | 7/2003 |
| JP | 2005-347821 A | 12/2005 |

* cited by examiner

Primary Examiner — Stephen R Koziol
(74) Attorney, Agent, or Firm — Holtz, Holtz, Goodman & Chick, P.C.

(57) ABSTRACT

A favorable noise reduction process that is optimized for capturing conditions and that prevents the occurrence of residual image components is enabled. Provided is an imaging system including: a first extraction section that extracts a local region that includes a pixel of interest from an image signal; a second extraction section that extracts, from another image signal captured at a different time, a local region located at almost the same position as said local region; a first noise reduction section that performs a noise reduction process by using the local regions; a noise estimation section that estimates an amount of noise included in the pixel of interest; a residual image detection section that detects a residual image component included in the local region based on the estimated amount of noise; and a second noise reduction section that performs a noise reduction process based on the detected residual image component.

15 Claims, 16 Drawing Sheets

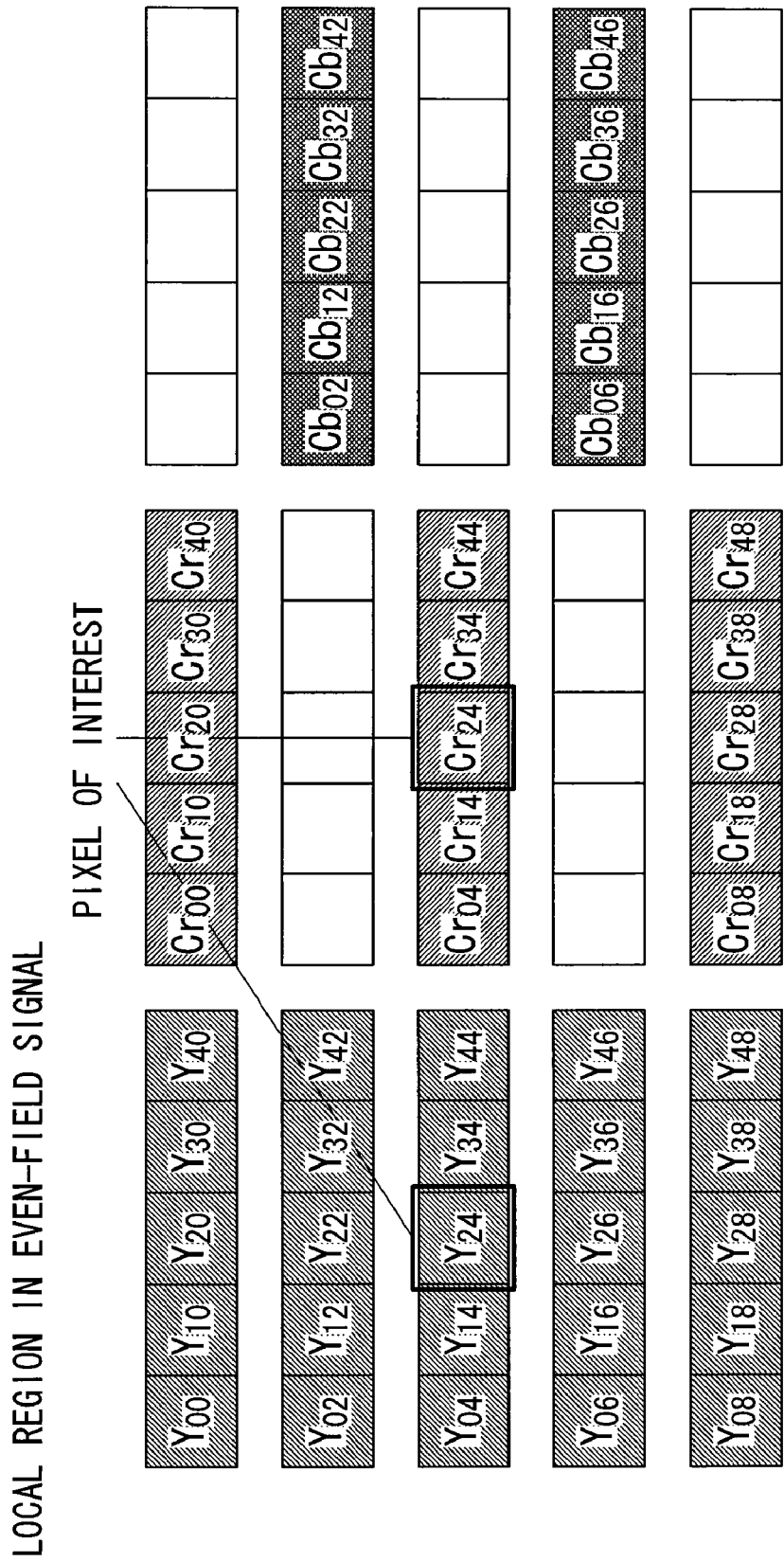

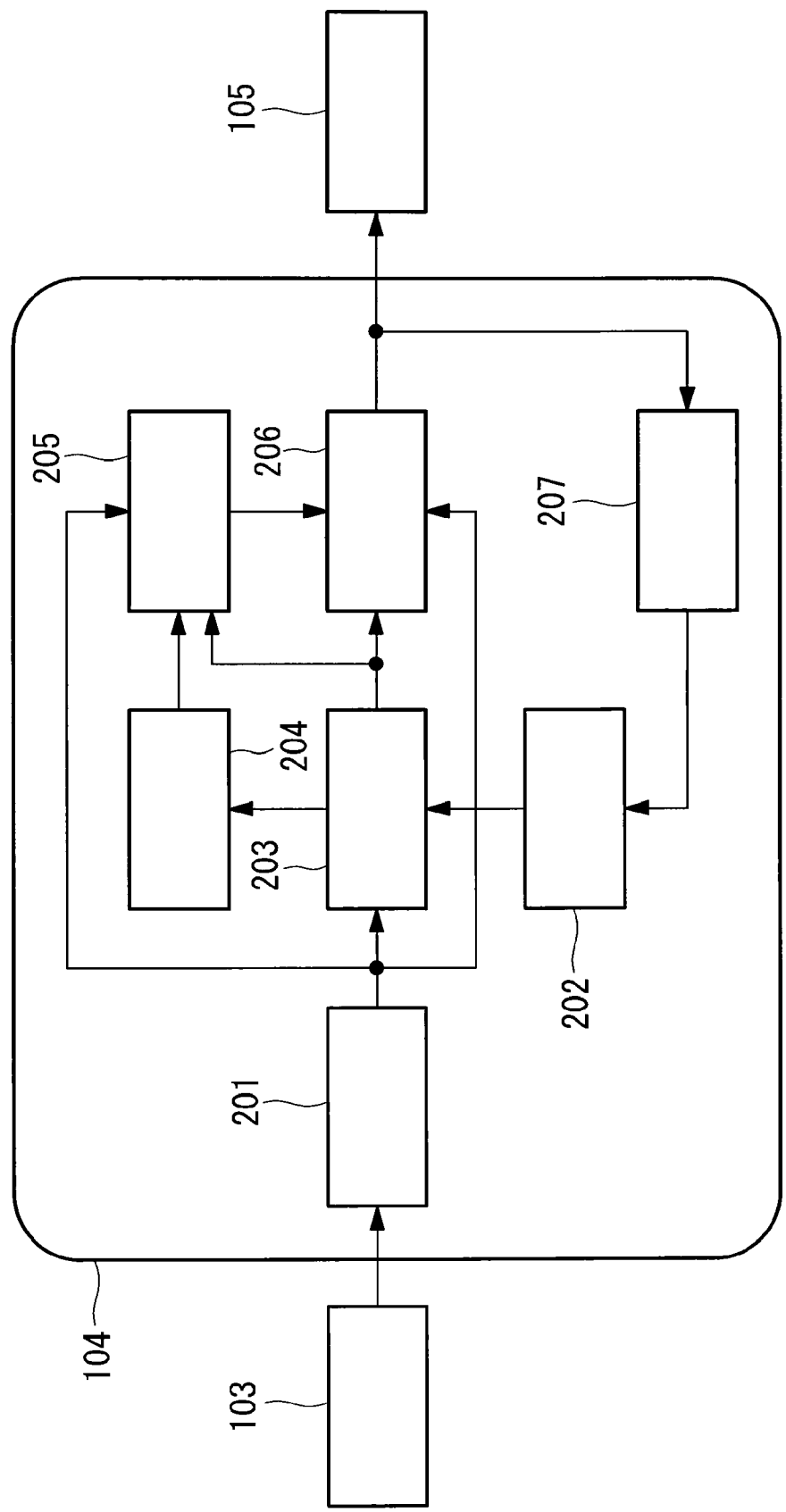

FIG. 11

ADJACENT PIXELS

| R00 | R10 | R20 | R30 | R40 |
|-----|-----|-----|-----|-----|
| R01 | R11 | R21 | R31 | R41 |
| R02 | R12 | R22 | R32 | R42 |
| R03 | R13 | R23 | R33 | R43 |
| R04 | R14 | R24 | R34 | R44 |

PIXEL OF INTEREST

| G00 | G10 | G20 | G30 | G40 |
|-----|-----|-----|-----|-----|
| G01 | G11 | G21 | G31 | G41 |
| G02 | G12 | G22 | G32 | G42 |
| G03 | G13 | G23 | G33 | G43 |
| G04 | G14 | G24 | G34 | G44 |

PIXEL OF INTEREST

| B00 | B10 | B20 | B30 | B40 |
|-----|-----|-----|-----|-----|
| B01 | B11 | B21 | B31 | B41 |
| B02 | B12 | B22 | B32 | B42 |
| B03 | B13 | B23 | B33 | B43 |
| B04 | B14 | B24 | B34 | B44 |

PIXEL OF INTEREST

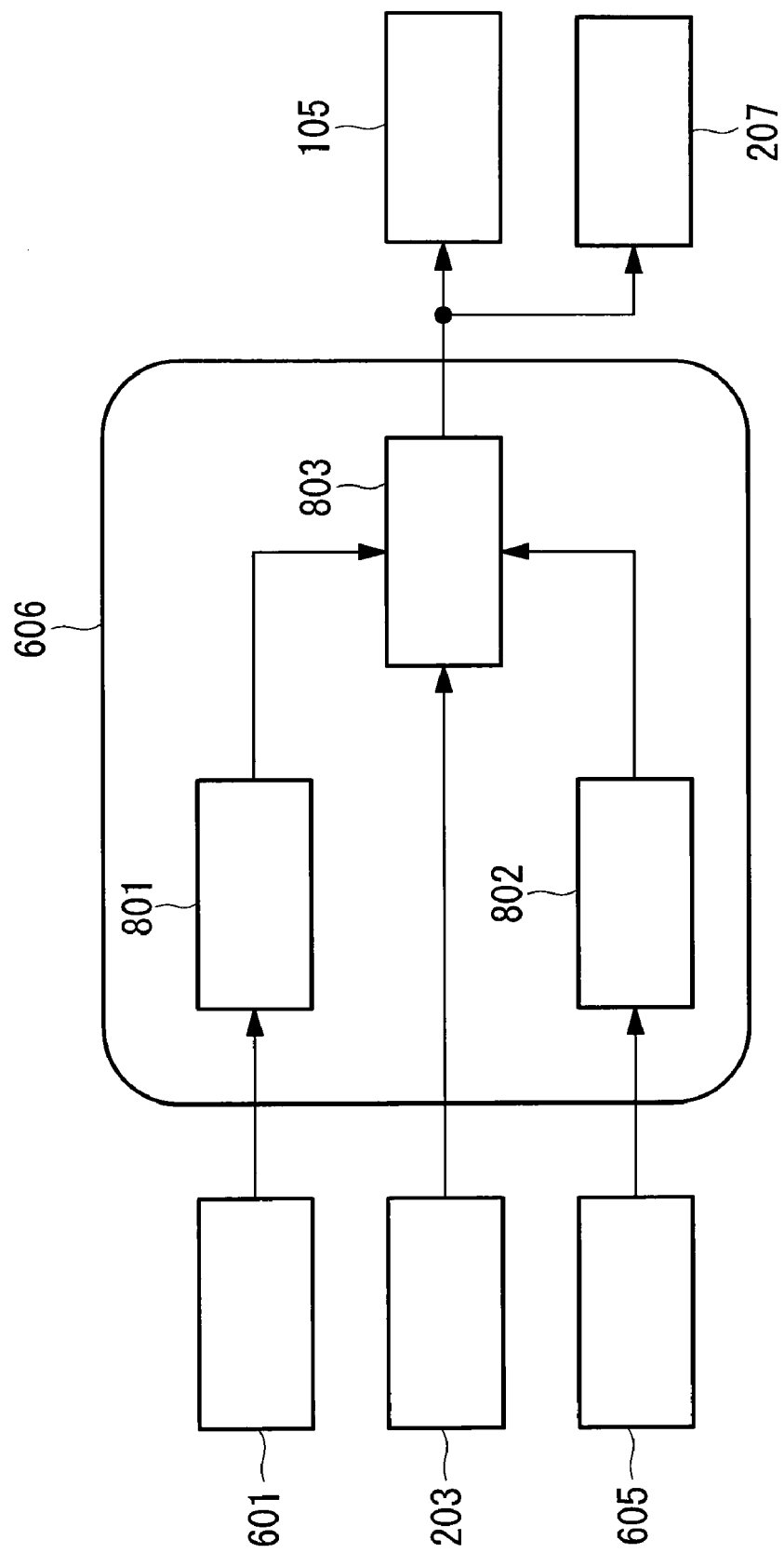

IMAGING SYSTEM, IMAGE PROCESSING METHOD, AND IMAGE PROCESSING PROGRAM

BACKGROUND OF THE INVENTION

1. Field of the Invention

The present invention relates to imaging systems, image processing methods, and image processing programs that reduce noise components in image signals captured in time series.

This application is based on Japanese Patent Application No. 2008-167864, the content of which is incorporated herein by reference.

2. Description of Related Art

In general, noise components are included in digitized image signals captured by an image pickup device and by an analog circuit and an analog-to-digital converter which are both associated therewith. A noise reduction process is performed to reduce the noise components included in the image signals to obtain high-definition images. For example, various three-dimensional noise reduction processes have been proposed in which moving images are treated as temporally-continuous image frames, and noise components that are not temporally correlated are reduced.

For example, in a three-dimensional noise reduction process, a differential signal is obtained through subtraction between the current image signal and a past image signal, and a value obtained by multiplying the differential signal between the frames by a constant factor is added to or subtracted from the current image signal, thereby reducing noise. With this three-dimensional noise reduction process, although a noise-reduction effect can be obtained, image deterioration such as residual images and tailing (hereinafter, referred to as residual image components) may occur in a moving part of the image because the differential signal includes not only noise components but also motion components.

In this case, motion information obtained from the differential signal etc. is used to calculate the above-mentioned factor. The factor is reduced for the moving part to lower the noise reduction effect to reduce residual image components.

As an example of such noise reduction processes, in Japanese Unexamined Patent Application, Publication No. HEI 6-62283, data temporally and spatially correlated to input pixel data is searched for to reduce noise. In Japanese Unexamined Patent Application, Publication No. HEI 6-62283, a nonlinear filter is used that assigns a large weight to a pixel having a value close to that of the input pixel data, assigns a small weight to a pixel having a value far from that of the input pixel data, and averages the pixel values. With this filter, a noise reduction process that corresponds to the movement of an object is performed.

As another example, in Japanese Unexamined Patent Application, Publication No. 2003-219208, the maximum value and the average value are detected among differential data from a preceding frame, the differential data being obtained for a predetermined period of time; setting information used to generate correction data and a control signal used to control the noise reduction process on and off are generated from the detected maximum value and average value; the amount of noise is detected with precision; and noise reduction is performed. In Japanese Unexamined Patent Application, Publication No. 2002-33942, the difference in pixel signal between a plurality of frames is detected as the degree of movement; the gain of cyclic noise is set based on the result; and noise reduction is performed.

As still another example, in Japanese Unexamined Patent Application, Publication No. 2005-347821, an image signal level and a movement detection result obtained from the frame difference are used to control a cyclic factor of noise, thereby performing a noise reduction process corresponding to the brightness of an image.

As still another example, Japanese Unexamined Patent Application, Publication No. 9-81754 discloses an apparatus in which the degree of movement is compared from the difference between frames; comparison results are checked by a majority decision circuit; a variation of the comparison results is corrected; the result is used as a movement signal to decide a cyclic factor of noise; and movement is detected successfully to perform noise reduction.

As described above, in the conventional three-dimensional noise reduction processes, the difference value from the current image signal is used to control the cyclic factor of noise to reduce residual image components detected when the image includes motion components.

However, the differential signal includes both the difference in motion component between images and the difference in noise component included in image signals. Therefore, when the sensitivity of detection of motion components is increased, the sensitivity of detection of the difference in noise components is decreased. The difference in noise components is thus falsely detected as motion components, and thus a good noise-reduction effect cannot be obtained. On the other hand, when the sensitivity of detection of motion components is decreased, motion components are falsely detected as noise components, leading to the disadvantage that residual image components occur in the original moving part.

Further, for example, when an image signal having a large noise-component value, such as that obtained when the gain of an input image-signal level is increased, is input, the difference in noise components is falsely detected as motion components, leading to a problem in that a noise-reduction effect cannot be obtained and a good noise reduction cannot be performed.

BRIEF SUMMARY OF THE INVENTION

The present invention provides imaging systems, image processing methods, and image processing programs allowing a superior noise reduction process that is optimized corresponding to capturing conditions and that prevents the occurrence of residual images.

According to a first aspect, the present invention provides an imaging system that applies noise reduction processing to image signals captured in time series via an image pickup block, including: a first extraction section that extracts a local region that includes a pixel of interest from an image signal to be processed; a second extraction section that extracts, from another image signal captured at a different time from the image signal to be processed, a local region located at almost the same position as the local region extracted by the first extraction section; a first noise reduction section that applies a first noise reduction process to the local region extracted by the first extraction section, by using the local region extracted by the second extraction section; a noise estimation section that estimates an amount of noise included in the pixel of interest based on the local region that has been subjected to the first noise reduction process in the first noise reduction section; a residual image detection section that detects a residual image component included in the local region that has been subjected to the first noise reduction process and that is output from the first noise reduction section, based on the amount of noise estimated by the noise estimation section;

and a second noise reduction section that performs a second noise reduction process on the pixel of interest based on the residual image component detected by the residual image detection section.

According to a second aspect, the present invention provides an image processing method of applying noise reduction processing to image signals captured in time series by an image pickup block, including: a first step of extracting a local region that includes a pixel of interest from an image signal to be processed; a second step of storing a predetermined number of image signals; a third step of extracting, from another image signal captured at a different time from the image signal to be processed, a local region located at almost the same position as the local region extracted in the first step; a fourth step of applying a first noise reduction process to the local region extracted in the first step, by using the local region extracted in the third step; a fifth step of estimating an amount of noise included in the pixel of interest based on the local region that has been subjected to the first noise reduction process in the fourth step; a sixth step of detecting a residual image component included in the local region that has been subjected to the first noise reduction process in the fourth step, based on the amount of noise estimated in the fifth step; and a seventh step of performing a second noise reduction process on the pixel of interest based on the residual image component detected in the sixth step.

According to a third aspect, the present invention provides an image processing program for causing a computer to apply noise reduction processing to image signals captured in time series by an image pickup block, the image processing program causing the computer to execute: a first process of extracting a local region that includes a pixel of interest from an image signal to be processed; a second process of storing a predetermined number of image signals; a third process of extracting, from another image signal captured at a different time from the image signal to be processed, a local region located at almost the same position as the local region extracted in the first process; a fourth process of applying a first noise reduction process to the local region extracted in the first process, by using the local region extracted in the third process; a fifth process of estimating an amount of noise included in the pixel of interest based on the local region that has been subjected to the first noise reduction process in the fourth process; a sixth process of detecting a residual image component included in the local region that has been subjected to the first noise reduction process in the fourth process, based on the amount of noise estimated in the fifth process; and a seventh process of performing a second noise reduction process on the pixel of interest based on the residual image component detected in the sixth process.

BRIEF DESCRIPTION OF THE SEVERAL VIEWS OF THE DRAWINGS

FIG. 2B is an explanatory diagram related to local-region extraction from an even-field signal obtained with the color-differential line-sequential complementary filters used in the imaging system shown in FIG. 1.

FIG. 3 is a block configuration diagram showing a noise reduction section of the imaging system shown in FIG. 1.

FIG. 11 is an explanatory diagram of the relationship between each of the arrays of RGB filters and local-region extraction, in the imaging system shown in FIG. 9.

FIG. 13 is a block configuration diagram showing a second noise reduction section of the imaging system shown in FIG. 9.

DETAILED DESCRIPTION OF THE INVENTION

First Embodiment

An imaging system according to a first embodiment of the present invention will be described below with reference to FIGS. 1 to 8.

Figure 1:
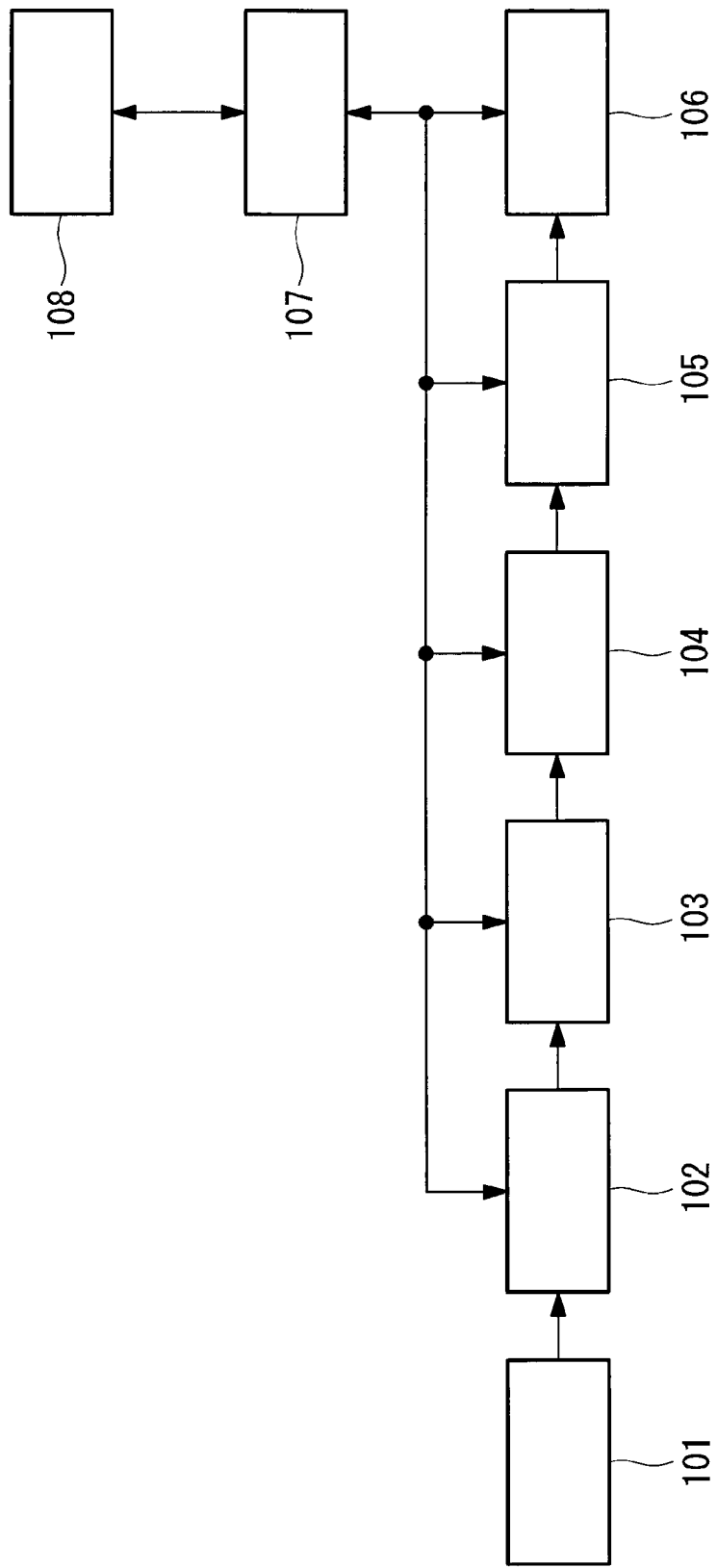
FIG. 1 is a schematic configuration diagram showing the entire configuration of an imaging system according to a first embodiment of the present invention.
Figure 2A:
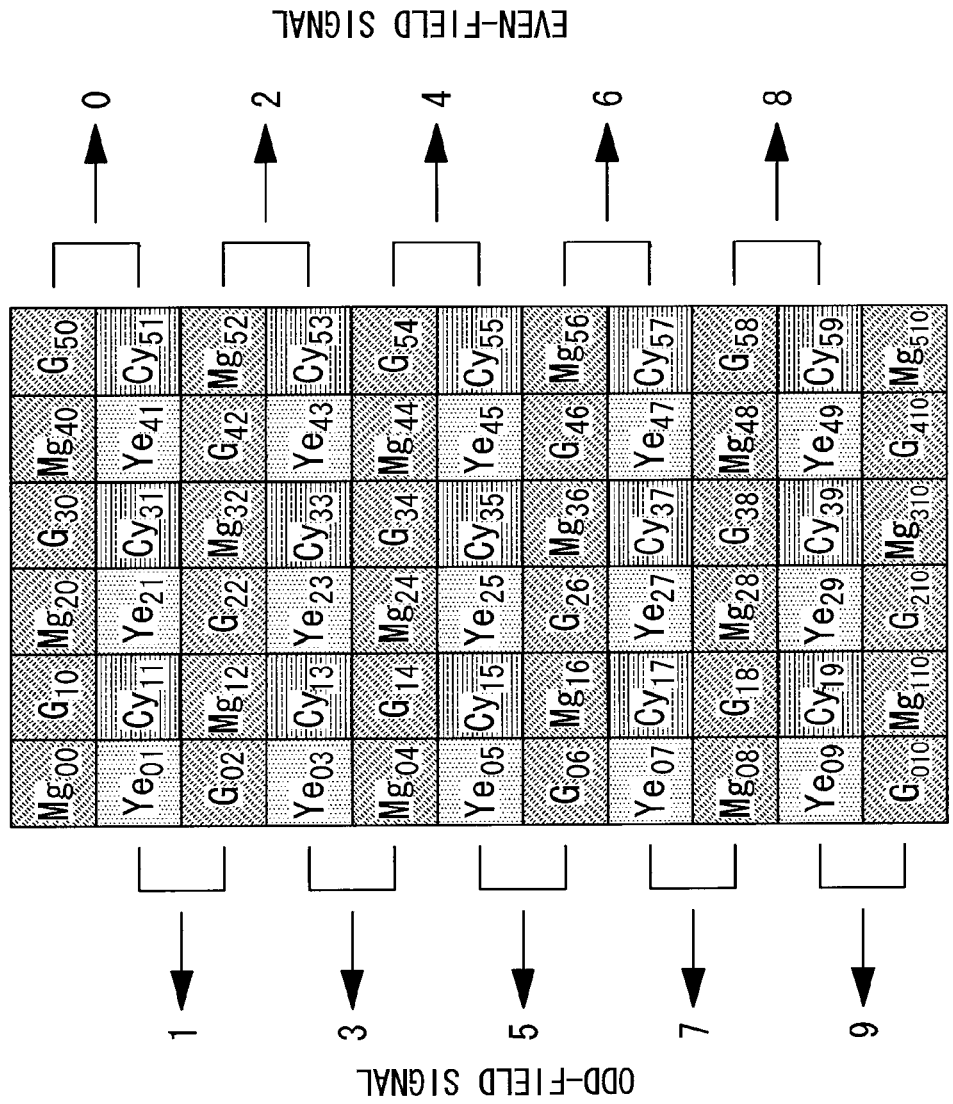
FIG. 2A is an explanatory diagram of an array of color-differential line-sequential complementary filters used in the imaging system shown in FIG. 1.
Figure 2C:
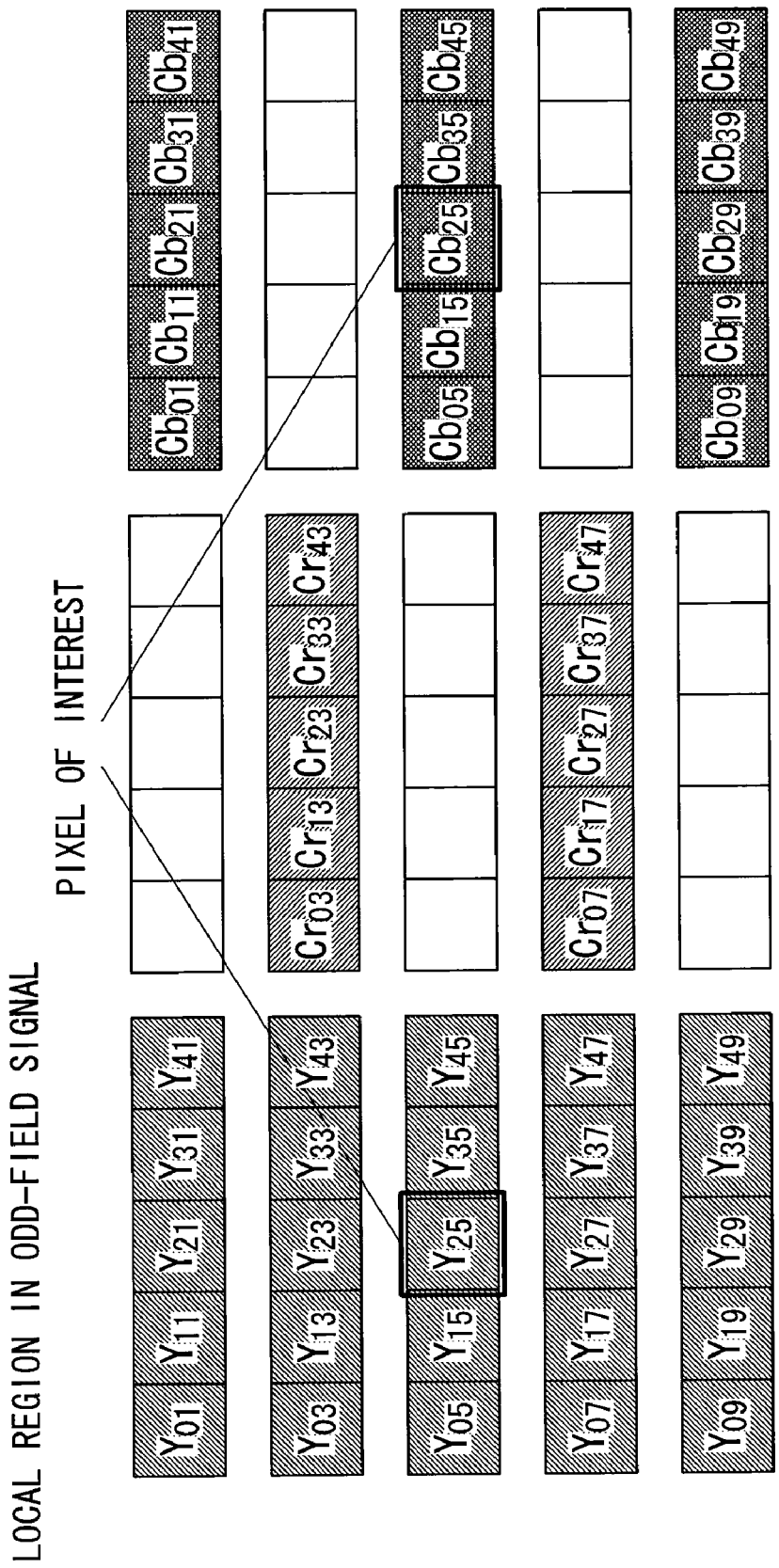
FIG. 2C is an explanatory diagram related to local-region extraction from an odd-field signal obtained with the color-differential line-sequential complementary filters used in the imaging system shown in FIG. 1.
Figure 4:
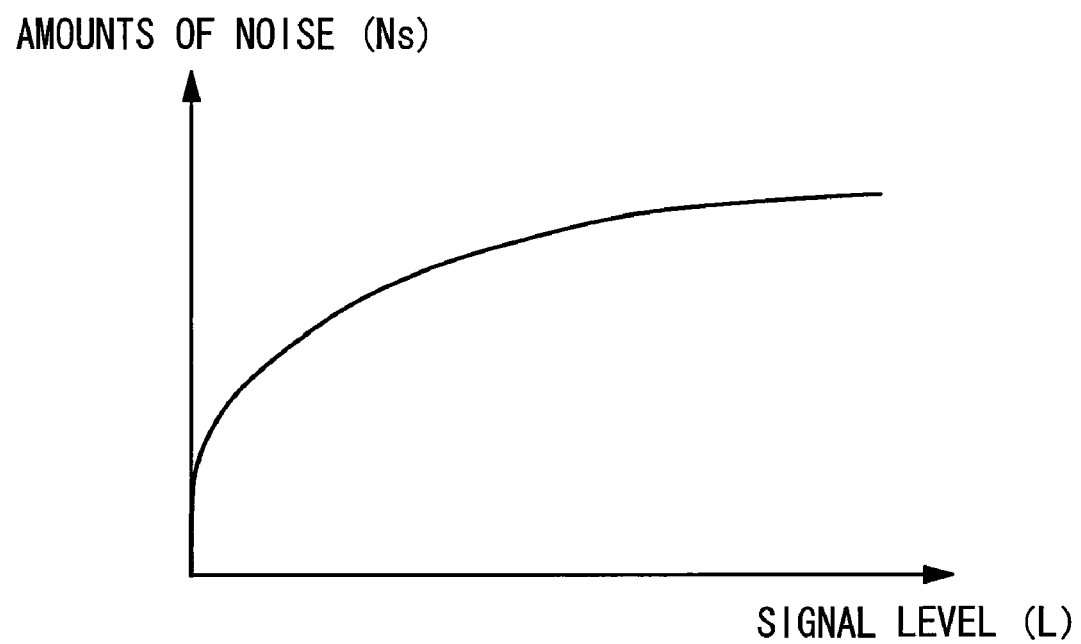
FIG. 4 is a graph showing the relationship between estimated amounts of noise and a signal level in the imaging system shown in FIG. 1.
Figure 5:
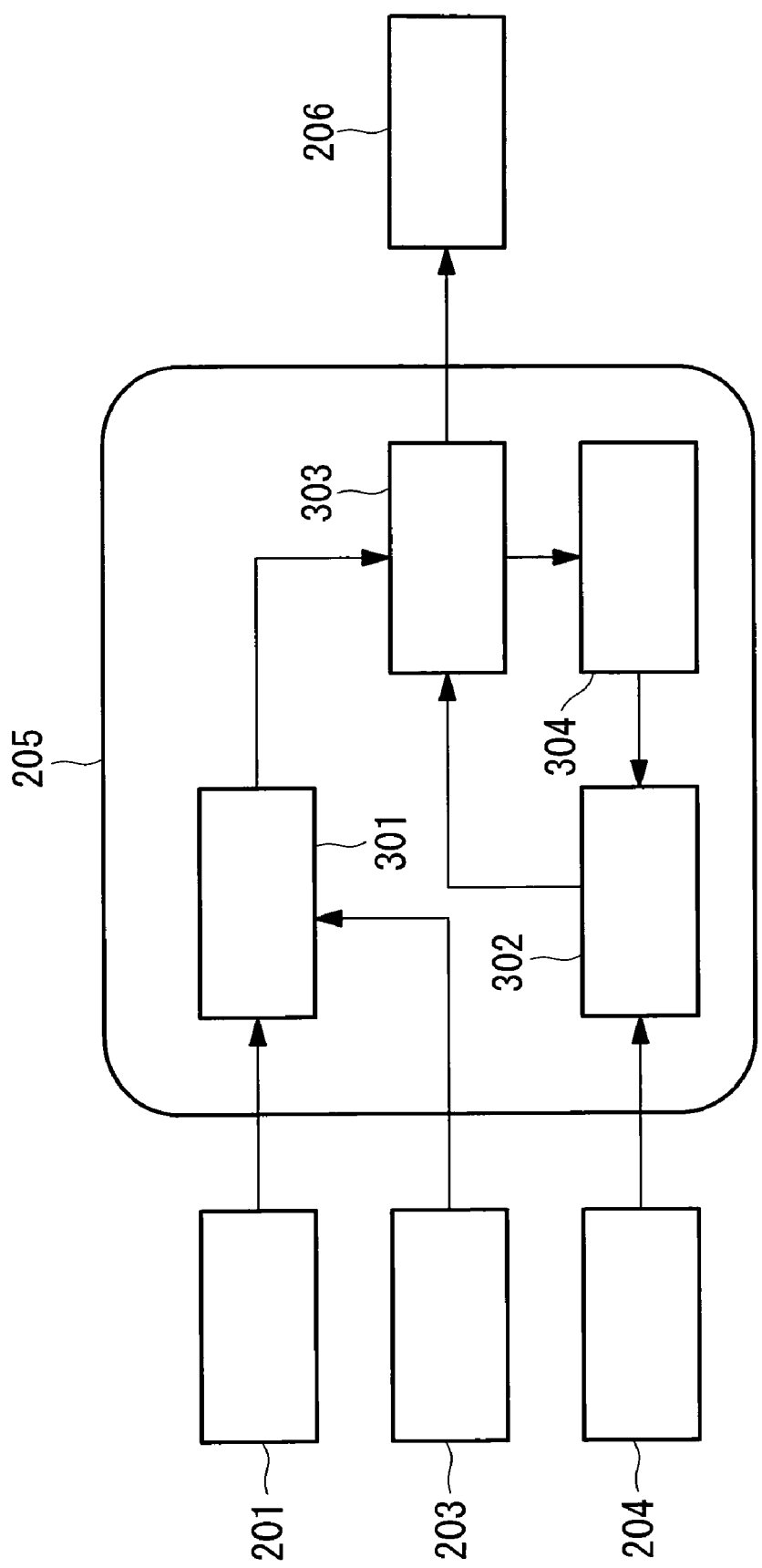
FIG. 5 is a block configuration diagram showing a residual image detection section of the imaging system shown in FIG. 1.
Figure 6:
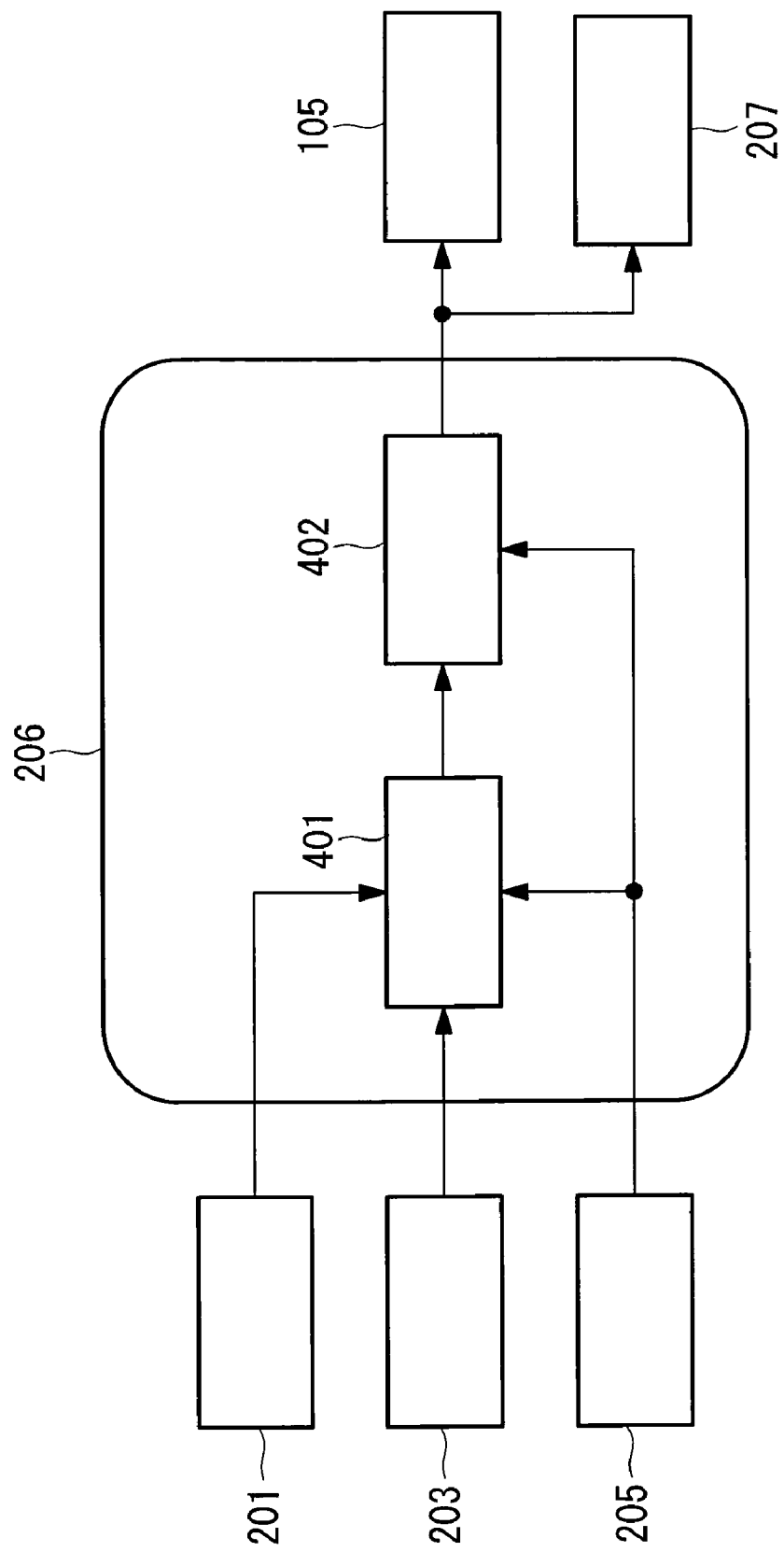
FIG. 6 is a block configuration diagram showing a second noise reduction section of the imaging system shown in FIG. 1.
Figure 7:
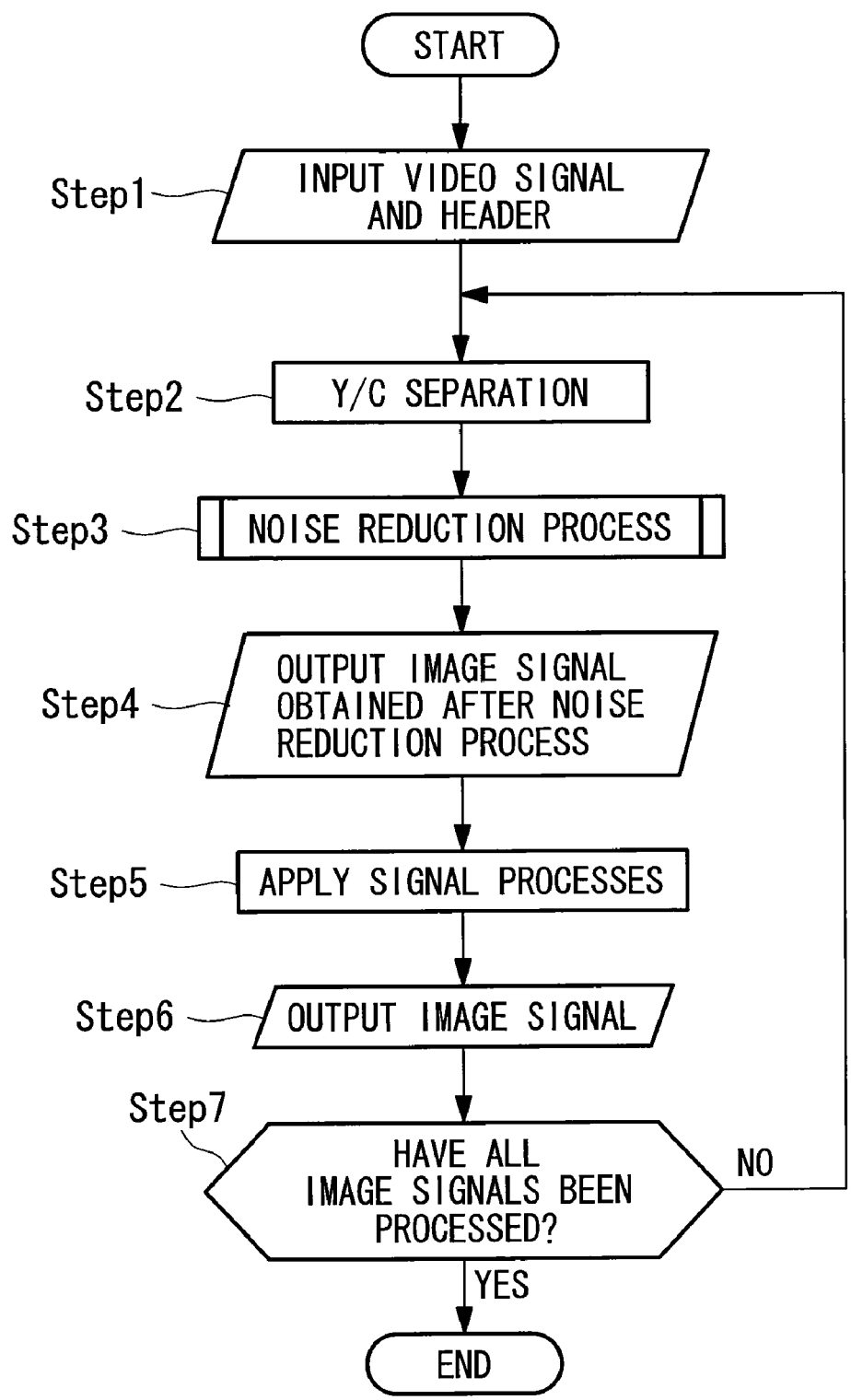
FIG. 7 is a flowchart showing the flow of the entire processing performed in the imaging system shown in FIG. 1.
Figure 8:
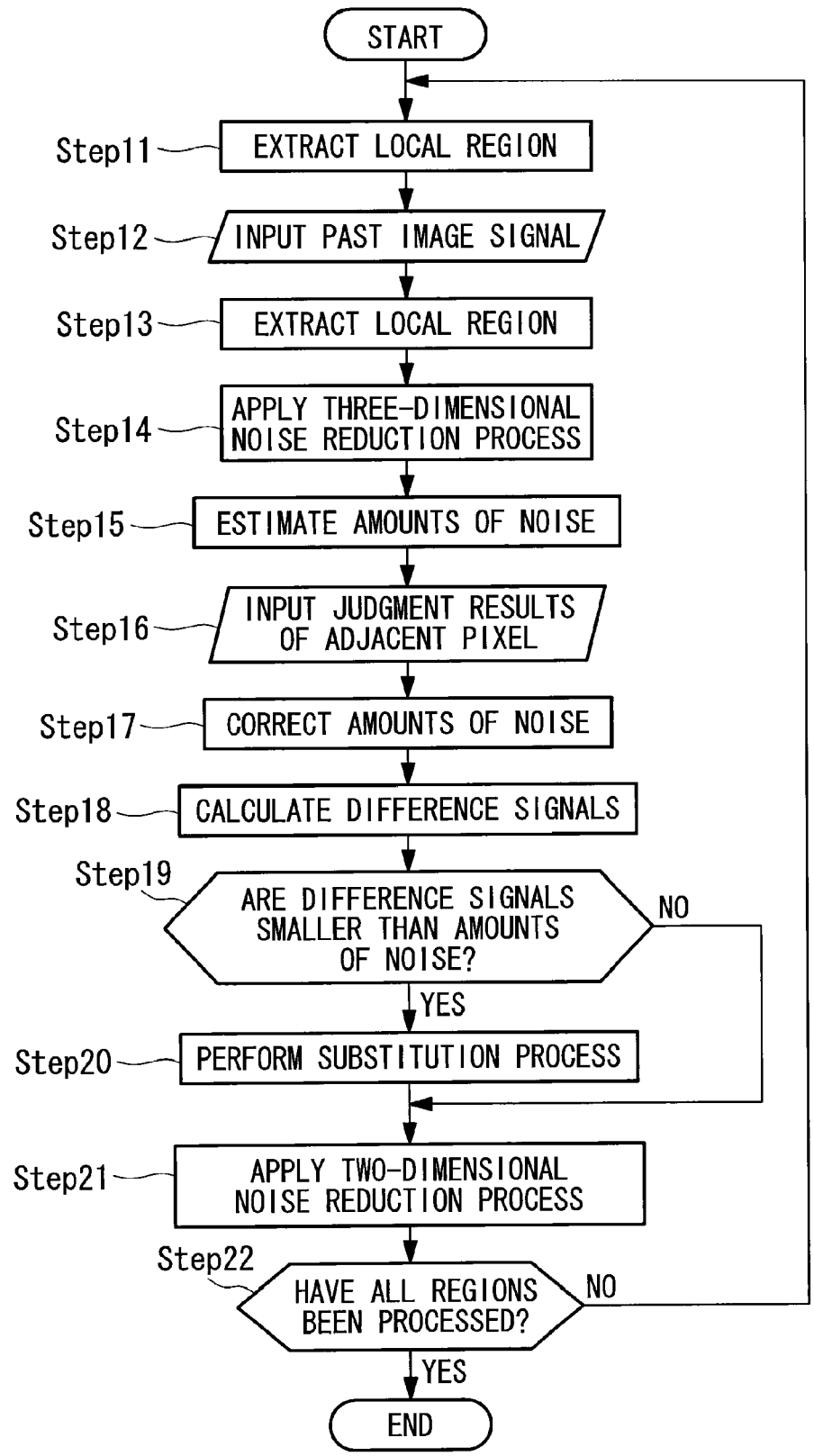
FIG. 8 is a flowchart showing the flow of a noise reduction process performed in the imaging system shown in FIG. 1.

FIG. 1 is a schematic configuration diagram showing the entire configuration of the imaging system according to this embodiment. FIG. 2A is an explanatory diagram of a color-differential line-sequential complementary filter array. FIG. 2B is an explanatory diagram related to local-region extraction from an even-field signal. FIG. 2C is an explanatory diagram related to local-region extraction from an odd-field signal. FIG. 3 is a block configuration diagram showing a noise reduction section of the imaging system shown in FIG. 1. FIG. 4 shows the relationship between the amounts of noise and a signal level. FIG. 5 is a block configuration diagram showing a residual image detection section of the imaging system shown in FIG. 1. FIG. 6 is a block configuration diagram showing a second noise reduction section of the imaging system shown in FIG. 1. FIG. 7 is a flowchart showing the flow of the entire processing performed in the imaging system shown in FIG. 1. FIG. 8 is a flowchart showing the flow of a noise reduction process performed in the imaging system shown in FIG. 1.

As shown in FIG. 1, the imaging system according to this embodiment includes an image pickup device (image pickup block) 101, an analog-to-digital converter 102, a Y/C separation section 103, a noise reduction section 104, a signal processing section 105, an output section 106, a control section 107, and an external interface section 108.

The image pickup device 101 applies photoelectric conversion to a formed optical image and outputs it as an analog image signal. Note that, in this embodiment, it is assumed that a single-plane image pickup device in which a color-differential line-sequential complementary filter such as that shown in FIG. 2A is disposed in front is used as the image pickup device 101. Note that the image pickup device 101 is not limited to this, and a single-plane image pickup device in which a Bayer primary color filter is disposed in front, or the like, may be used as the image pickup device 101.

FIG. 2A shows the configuration of the color-differential line-sequential complementary filters. In this color-differential line-sequential complementary filters, 2×2 pixels are treated as a base unit, and Cyan (Cy), Magenta (Mg), Yellow (Ye), and Green (G) are arranged at respective pixels. However, the positions of Mg and G are inverted every line.

An image signal transferred from the image pickup device 101 is composed of two field signals separated into even lines and odd lines obtained by adding two vertically adjacent lines in the manner shown in FIG. 2A. An even-field signal and an odd-field signal are combined to obtain one image signal. Hereinafter, a plurality of image signals that are sequentially output are referred to as a video signal, and one image signal is just referred to as an image signal.

Under the control of the control section 107, the analog-to-digital converter 102 converts an analog image signal output from the image pickup device 101 into a digital image signal. A video signal captured through the image pickup device 101 is sequentially output as an analog signal at predetermined time intervals. The analog signal is converted into a digital signal in the analog-to-digital converter 102, and the digital signal is transferred to the Y/C separation section 103.

Under the control of the control section 107, the Y/C separation section 103 calculates a luminance signal Y and color-difference signals Cb and Cr from the even-field signal and the odd-field signal, as shown in Expression 1.

$$Y = G + Mg + Ye + Cy$$

$$Cb = (Mg + Cy) - (G + Ye)$$

$$Cr = (Mg + Ye) - (G + Cy) \quad \text{[Expression 1]}$$

Under the control of the control section 107, the noise reduction section 104 performs a noise reduction process by using the image signal transferred from the Y/C separation section 103. The image signal that has been subjected to the noise reduction process is transferred to the signal processing section 105.

As shown in FIG. 3, the noise reduction section 104 includes, for example, a first region extraction section (first extraction section) 201, a second region extraction section (second extraction section) 202, a first noise reduction section 203, a noise estimation section 204, a residual image detection section 205, a second noise reduction section 206, and a frame memory (storage section) 207.

FIG. 3 is a block configuration diagram showing the noise reduction section of the imaging system shown in FIG. 1.

Further, the Y/C separation section 103 is connected to the signal processing section 105 via the first region extraction section 201, the first noise reduction section 203, and the second noise reduction section 206. The first region extraction section 201 is also connected to the residual image detection section 205 and the second noise reduction section 206.

The first noise reduction section 203 is also connected to the noise estimation section 204 and the residual image detection section 205. The noise estimation section 204 is connected to the residual image detection section 205. The residual image detection section 205 is connected to the second noise reduction section 206. The second noise reduction section 206 is also connected to the frame memory 207. The frame memory 207 is connected to the first noise reduction section 203 via the second region extraction section 202.

Under the control of the control section 107, the signal processing section 105 reads the image signal that has been subjected to the noise reduction process from the noise reduction section 104, applies known processes, such as an interpolation process, an enhancement process, and a compression process, to the read image signal, and transfers the image signal that has been subjected to those processes to the output section 106.

The output section 106 records and stores the video signal output from the signal processing section 105, in a recording medium such as a memory card.

The control section 107 is implemented by a microcomputer, for example, and is bi-directionally connected to the analog-to-digital converter 102, the Y/C separation section 103, the noise reduction section 104, the signal processing section 105, the output section 106, and the external interface section 108, so as to control the whole of an image processing apparatus that includes those sections.

Further, the control section 107 is bi-directionally connected to the first region extraction section 201, the second region extraction section 202, the first noise reduction section 203, the noise estimation section 204, the residual image detection section 205, and the second noise reduction section 206, so as to control those sections.

The external interface section 108 is an interface for receiving an input from a user to this image processing apparatus to which an imaging system is applied. The external interface section 108 includes a power switch used for turning the power on or off, a shutter button used to start an image pickup operation, and a mode switch button used to switch the mode among an image pickup mode and other various modes. The user can specify the gain etc. through the external interface section 108. Then, the external interface section 108 outputs the received information to the control section 107.

From an image signal to be subjected to the noise reduction process, the first region extraction section 201 sequentially extracts a local region that includes a pixel of interest and adjacent pixels located adjacent to the pixel of interest, under the control of the control section 107, and outputs it to the first noise reduction section 203, the residual image detection section 205, and the second noise reduction section 206.

In this embodiment, it is assumed that the local region is formed of 5×5 pixels, as shown in FIGS. 2B and 2C. The pixel region is not limited to this, and any pixel region may be specified as a local region. For example, a square region formed of 3×3 pixels or a rectangular region formed of 7×5 pixels may be specified as a local region.

As another example, a square region formed of 4×4 pixels or a rectangular region formed of 4×6 pixels may be specified as a local region. In this case, since the center portion of the square region is formed of not one pixel but a plurality of pixels, one of the pixels serves as the pixel of interest.

The size of a local region may be specified in advance according to a user instruction. The luminance signal Y is included in all of the 5×5 pixels, as shown in FIG. 2B for the even field and as shown in FIG. 2C for the odd field. In contrast, color-difference signals Cr and Cb are not included in all of the 5×5 pixels. Specifically, the color-difference signal Cr is included in 5×3 pixels in the even field, as shown in FIG. 2B, and in 5×2 pixels in the odd field, as shown in FIG. 2C. Further, the color-difference signal Cb is included in 5×2 pixels in the even field, as shown in FIG. 2B, and in 5×3 pixels in the odd field, as shown in FIG. 2C.

In such local-region configurations, the pixel of interest (for example, the pixel located at the center of a local region) to be subjected to the noise reduction process includes either the luminance signal Y and the color-difference signal Cr (the color-difference signal Cb is not subjected to the process), or the luminance signal Y and the color-difference signal Cb (the color-difference signal Cr is not subjected to the process). In the examples shown in FIGS. 2B and 2C, the former case corresponds to the even field, and the latter case corresponds to the odd field. In contrast, however, if the pixel of interest is located at a different position, the latter case may correspond to the even field and the former case may correspond to the odd field.

From a past image signal that has been subjected to the noise reduction process and that is stored in the frame memory 207, the second region extraction section 202 sequentially extracts a local region that includes a pixel located in the same spatial position as the above-mentioned pixel of interest, and adjacent pixels located adjacent to that pixel, under the control of the control section 107, and outputs it to the first noise reduction section 203. Note that only the pixel located at the same spatial position as the pixel of interest may be extracted, or only pixels located adjacent to the same spatial position as the pixel of interest may be extracted.

In the above-described configuration, at a point in time when the noise reduction section 104 applies the noise reduction process to an image signal obtained at time T, the first region extraction section 201 extracts a local region from the image signal obtained at time T, and the second region extraction section 202 extracts a local region from an image signal that was obtained before time T.

Note that the image signal obtained at time T may be stored and subjected to the noise reduction process based on another image signal obtained at a different time after time T.

Under the control of the control section 107, the first noise reduction section 203 performs a three-dimensional noise reduction process based on the local region obtained at time T that is transferred from the first region extraction section 201 and based on the local region obtained before time T that has been subjected to the noise reduction process and that is transferred from the second region extraction section 202. In this embodiment, it is assumed that a nonlinear filter is used in which, with respect to the pixel of interest, the adjacent pixels obtained at time T, and adjacent pixels (including the pixel located at the same spatial position as the pixel of interest) obtained before time T, weighted addition is applied with a large weight being assigned to an adjacent pixel having a value close to that of the pixel of interest and with a small weight being assigned to an adjacent pixel having a value far from that of the pixel of interest. The first noise reduction section 203 outputs to the noise estimation section 204 a luminance signal NRy and color-difference signals NRcb and NRcr of the pixel of interest that are obtained after the three-dimensional noise reduction process.

Under the control of the control section 107, the noise estimation section 204 estimates the amounts of noise Ns (s=y, cb, cr) in the pixel of interest by using the signal values NRs (s=y, cb, cr) of the pixel of interest that are obtained after the three-dimensional noise reduction process and that are transferred from the first noise reduction section 203.

Referring to FIG. 4, estimation of the amounts of noise will be described. FIG. 4 shows the relationship between the amounts of noise Ns (s=y, cb, cr) and a signal level L. As shown in FIG. 4, the amounts of noise Ns increase in quadratically with respect to the signal level L. When the signal level L is set to the signal values NRs (s=y, cb, cr) obtained after the three-dimensional noise reduction process, constituting such a specific noise model by using a quadratic function yields Expression 2.

$$Ny = \alpha y \times NRy^2 + \beta y \times NRy + \gamma y$$

$$Ncb = \alpha cb \times NRcb^2 + \beta cb \times NRcb + \gamma cb$$

$$Ncr = \alpha cr \times NRcr^2 + \beta cr \times NRcr + \gamma cr \qquad \text{[Expression 2]}$$

where $\alpha$s, $\beta$s, and $\gamma$s are constant terms. The noise estimation section 204 uses models such as those shown in Expression 2 to estimate the amounts of noise Ns from the signal values NRs (s=y, cb, cr) of the pixel of interest that are obtained after the three-dimensional noise reduction process. A luminance noise amount Ny and color-difference noise amounts Ncb and Ncr are output to the residual image detection section 205.

Under the control of the control section 107, the residual image detection section 205 detects residual image components included in the signal values NRs (s=y, cb, cr) obtained after the three-dimensional noise reduction process, based on the estimated amounts of noise Ns (s=y, cb, cr). Judgment results Ts (s=y, cb, cr) indicating whether residual image components are included in the pixel of interest are output to the second noise reduction section 206. The judgment results Ts indicate either that "residual image components are included" or that "residual image components are not included".

Under the control of the control section 107, the second noise reduction section 206 applies a two-dimensional noise reduction process to the luminance signal Y and the color-difference signals Cb and Cr of the pixel of interest by using the signal values NRs obtained after the three-dimensional noise reduction process, and the judgment results Ts received from the residual image detection section 205. The second noise reduction section 206 outputs a luminance signal NR2$y$ and color-difference signals NR2$cb$ and NR2$cr$ of the pixel of interest that are obtained after the two-dimensional noise reduction process, to the signal processing section 105 and the frame memory 207.

Thus, the image signal that has been subjected to the noise reduction process is recorded in the frame memory 207 and will be used for processing for the next image signal.

Next, the detailed configuration of the residual image detection section 205 will be described with reference to FIG. 5.

Under the control of the control section 107, a calculation section 301 calculates absolute difference signal values Ss (s=y, cb, cr) between the luminance signal value Y and the color-difference signal values Cb and Cr of the pixel of interest in the local region, transferred from the first region extraction section 201, and the luminance signal value NRy and the color-difference signal values NRcb and NRcr, obtained after the three-dimensional noise reduction process, and outputs the absolute difference signal values Ss to a judgment section 303. The absolute difference signal values Ss include noise components in the signal values of the pixel of interest or residual image components in the signal values obtained after the three-dimensional noise reduction process.

Under the control of the control section 107, an adjustment section 302 adjusts the estimated amounts of noise Ns output from the noise estimation section 204 and outputs adjusted estimated amounts of noise CNs (s=y, cb, cr) to the judgment section 303. The adjustment section 302 reads the judgment results of a pixel located adjacent to the pixel of interest from a judgment-result storage section 304. It is assumed that one adjacent pixel is used, but the number of adjacent pixels is not limited to this. As another example, four adjacent pixels or eight adjacent pixels may be used. When the judgment results Ts of the adjacent pixel indicate that "residual image components are included", the adjustment section 302 adjusts the estimated amounts of noise Ns to make them smaller.

Under the control of the control section 107, the judgment section 303 compares the absolute difference signal values Ss output from the calculation section 301 with the adjusted estimated amounts of noise CNs output from the adjustment section 302, to judge whether residual image components are included in the noise-reduced luminance signal values NRy and in the noise-reduced color-difference signal values NRcb and NRcr.

When the absolute difference signal values Ss are larger than the adjusted estimated amounts of noise CNs, it is judged that residual image components are included in the signal values NRs, obtained after the three-dimensional noise reduction process. Then, the judgment results Ts, indicating whether residual image components are included in the pixel of interest, are set to indicate that "residual image components are included". On the other hand, when the absolute difference signal values Ss are smaller than the adjusted estimated amounts of noise CNs, it is judged that residual image components are not included in the signal values NRs, obtained after the three-dimensional noise reduction process. Then, the judgment results Ts are set to indicate that "residual image components are not included". The judgment results Ts are output to the second noise reduction section 206 and the judgment-result storage section 304.

Next, the detailed configuration of the second noise reduction section 206 will be described with reference to FIG. 6.

Under the control of the control section 107, a switching section 401 switches the luminance signal Y and the color-difference signals Cb and Cr of the pixel of interest, transferred from the first region extraction section 201, to the signal values NRs of the pixel of interest, obtained after the three-dimensional noise reduction process and transferred from the first noise reduction section 203.

Specifically, when the judgment results Ts obtained by the residual image detection section 205 indicate that "residual image components are not included", the switching section 401 substitutes the signal values NRs of the pixel of interest, obtained after the three-dimensional noise reduction process, into the luminance signal value Y and the color-difference signal values Cb and Cr of the pixel of interest, as shown in Expression 3.

$Y = NRy$ $Cb = NRcb$ $Cr = NRcr$ [Expression 3]

When the judgment results Ts obtained by the residual image detection section 205 indicate that "residual image components are included", the switching section 401 does not perform the substitution process for the luminance signal value Y and the color-difference signal values Cb and Cr of the pixel of interest. Then, the switching section 401 outputs the luminance signal value Y and the color-difference signal values Cb and Cr of the pixel of interest to a two-dimensional noise reduction section 402.

Under the control of the control section 107, the two-dimensional noise reduction section 402 performs a two-dimensional noise reduction process based on the pixel values of the pixel of interest that are transferred from the switching section 401, the pixel values of a pixel located adjacent to the pixel of interest that are stored in a line memory (not shown) included in the two-dimensional noise reduction section 402, and the judgment results Ts transferred from the residual image detection section 205. In this embodiment, it is assumed that a nonlinear filter is used in which, with respect to the pixel of interest and adjacent pixels, weighted addition is performed with a large weight being assigned to an adjacent pixel that is spatially close to the pixel of interest and with a small weight being assigned to an adjacent pixel that is spatially far from the pixel of interest; and further, weighted addition is performed with a large weight being assigned to an adjacent pixel having a value close to that of the pixel of interest and with a small weight being assigned to an adjacent pixel having a value far from that of the pixel of interest.

When the judgment results Ts of the pixel of interest indicate that "residual image components are included", weighted addition is performed with a large weight being assigned to an adjacent pixel. The two-dimensional noise reduction section 402 outputs a luminance signal NR2y and color-difference signals NR2cb and NR2cr of the pixel of interest that are obtained after the two-dimensional noise reduction process to the signal processing section 105 and the frame memory 207.

Note that a description has been given of an image pickup apparatus in which image pickup parts, such as the image pickup device 101 and the analog-to-digital converter 102, are integrated, as an example of a video signal processing apparatus; however, the video signal processing apparatus is not limited to this configuration. For example, a configuration may be used in which a video signal captured by a separately provided image pickup part is recorded in a recording medium, such as a memory card, as unprocessed raw data; accompanying information, such as image pickup conditions and data obtained at the time of image pickup, is also recorded in the recording medium as header information; and the information recorded in the recording medium is read and processed by the video signal processing apparatus.

When the video signal processing apparatus has a separately provided image pickup part, transmission of information to the video signal processing apparatus is not limited to that performed through a recording medium; it can, of course, be performed through wired or wireless communication lines.

Further, in the above description, it is assumed that the processing is performed by hardware; however, the way the processing is performed is not limited to this configuration. For example, a configuration may be used in which a signal transferred from the image pickup device 101 is output as unprocessed raw data together with header information, such as a configuration selected during capturing, the gain, and the amount of a change in luminance level, transferred from the control section 107; and the signal is processed in a computer by a video signal processing program serving as separate software.

Referring to FIG. 7, a description will be given of the flow of processing performed when the computer executes the video signal processing program.

When the processing is started, a video signal and header information, such as gain, are read (Step 1).

Next, each image signal included in the read video signal is separated into a luminance signal and color-difference signals, as shown in Expression 1 (Step 2).

As will be described later with reference to FIG. 8, the noise reduction process is applied to the luminance signal and the color-difference signals (Step 3).

Further, the image signal that has been subjected to the noise reduction process is output (Step 4).

Known signal processes, such as a gradation conversion process, an enhancement process, and a compression process, are applied to the image signal that has been subjected to the noise reduction process (Step 5).

Next, the image signal that has been subjected to the signal processes is output (Step 6).

It is judged whether all image signals included in the video signal have been processed (Step 7). If it is judged that all image signals included in the video signal have not been processed, the flow returns to Step 2, and the above-described processing is repeatedly performed for the next image signal.

On the other hand, if it is judged that all image signals included in the video signal have been processed, the processing ends.

Next, the noise reduction process performed in Step 3 of FIG. 7 will be described in detail with reference to FIG. 8.

When the process is started, a local region that includes a pixel of interest is extracted from the image signal that is being subjected to the noise reduction process, as shown in FIGS. 2B and 2C (Step 11).

Then, a past image signal that was subjected to the noise reduction process is input (Step 12).

Further, a local region that includes a pixel located at the same spatial position as the pixel of interest is extracted from the past image signal (Step 13).

Next, the three-dimensional noise reduction process is performed based on the local region that includes the pixel of interest and based on the past local region (Step 14).

The amounts of noise are estimated, as shown in Expression 2, based on the signal values of the pixel of interest that are obtained after the three-dimensional noise reduction process (Step 15).

The judgment results of an adjacent pixel located adjacent to the pixel of interest are read (Step 16).

The amounts of noise are corrected based on the judgment results of the adjacent pixel (Step 17).

Next, the absolute difference values between the signal values of the pixel of interest that are obtained through the separation in Step 2 and the signal values of the pixel of interest that are obtained after the three-dimensional noise reduction process that are calculated in Step 14 are calculated (Step 18).

It is judged whether the absolute difference values for the pixel of interest are smaller than the corrected estimated amounts of noise (Step 19).

When it is judged in Step 19 that the absolute difference values for the pixel of interest are smaller than the corrected estimated amounts of noise, the signal values of the pixel of interest that are obtained after the three-dimensional noise reduction process are substituted into the signal values of the pixel of interest (Step 20).

Next, the two-dimensional noise reduction process is performed based on the local region that includes the pixel of interest (Step 21).

Then, it is judged whether all local regions that can be extracted from the image signal have been processed (Step 22). If it is judged that all local regions that can be extracted from the image signal have not been processed, the flow returns to Step 11, and the next local region is extracted and processed as described above.

On the other hand, if it is judged in Step 22 that all local regions that can be extracted from the image signal have been processed, the flow returns to the processing shown in FIG. 7.

Note that, although the number of past image signals used for the noise reduction process is not limited in the above description, only an image signal immediately preceding the image signal that is being subjected to the process may be used or a plurality of image signals captured before the image signal that is being subjected to the process may be used. In the latter case, however, the frame memory 207 requires a storage capacity capable of storing the signals of a plurality of frames, the second region extraction section 202 performs the corresponding process for the number of frames that are to be subjected to the process, and the first noise reduction section 203 performs the corresponding process for the plurality of frames.

Although it is assumed that the factors, $\alpha$s, $\beta$s, and $\gamma$s (s=y, cb, cr), in Expression 2 are just constant terms in the above description, if the factors are constant terms that depend on the temperature, the gain, etc. of the image pickup device 101 obtained when the image signal was captured, it is also possible to deal with such factors.

According to this embodiment, since the amounts of noise are estimated with high precision corresponding to factors that dynamically change at the time of capturing, such as the movement of an object, the signal level, and the luminance level, it is possible to apply the optimum noise reduction to the entire screen. As a result, a high-definition video signal can be obtained.

At this time, since the amounts of noise included in an image signal to be processed are estimated based on a past image signal from which noise components have been eliminated, the precision in estimating the amounts of noise can be improved.

Further, since the amount of luminance noise and the amounts of color-difference noise are estimated independently, the precision in estimating them can be improved.

Since the noise reduction process is performed with a noise range being specified based on the amounts of noise, signal values that are totally different from those of the original signal are not obtained, which is advantageous in that it leads to good capability of maintaining the original signal. When it is judged that the amounts of noise of the pixel of interest fall within the noise range, the pixel values obtained after the three-dimensional noise reduction process are used as those of the pixel of interest. When it is judged that the amounts of noise of the pixel of interest do not fall within the noise range, the values of the pixel of interest are corrected based on the amounts of noise. Therefore, it is possible to prevent the occurrence of a discontinuity caused by the noise reduction process, thus obtaining a high-definition signal.

The signal obtained after the noise reduction process is output as an actual signal, and then, various signal processes are applied thereto. Thus, compatibility with conventional processing systems is maintained, leading to an advantage in that a combination with various systems is allowed.

Since a luminance signal and color-difference signals are obtained corresponding to the color-differential line-sequential complementary filter array, high-speed processing is enabled.

Further, the estimated amounts of noise Ns are corrected based on the residual image judgment results of an adjacent pixel. Specifically, when residual image components that are spatially correlated are included in the adjacent pixel, the noise range is narrowed, in other words, the range to which the three-dimensional noise reduction process (see Expression 3) is applied is narrowed. Therefore, the residual image components can be eliminated with high precision from the image that has been subjected to the three-dimensional noise reduction process. On the other hand, when the residual image components are not included in the adjacent pixel, the noise range is not changed, and the three-dimensional noise reduction process can be effectively applied to a static object. Thus, a high-definition signal can be obtained.

When it is judged that residual image components are included in the image signal of the pixel of interest that has been subjected to the three-dimensional noise reduction process, adjustment is made such that a weight for the two-dimensional noise reduction process is made larger. Therefore, it is possible to prevent the occurrence of a discontinuity caused by the noise reduction process, thus obtaining a high-definition signal.

According to this embodiment, based on an image signal that was obtained at a different time and stored in the storage section, the amounts of noise of a luminance signal and color-difference signals are modeled corresponding to factors that dynamically change at the time of capturing, such as the signal level and gain, and the amounts of noise are estimated based on the models. Then, based on the estimated amounts of noise, residual image components included in the local region that has been subjected to the three-dimensional noise reduction process in the first noise reduction section are detected, and the two-dimensional noise reduction process is applied to reduce the residual image components. As a result, it is possible to perform a noise reduction process that suppresses residual image components to obtain a high-definition image signal.

Note that the present invention is not limited to the above-described embodiment, and the components can be modified and embodied in the phase of reduction to practice, without departing from the scope thereof. Further, a plurality of components disclosed in the above-described embodiment can be appropriately combined to form various aspects of the invention. For example, some components may be deleted from all of the components shown in the embodiment. Furthermore, components from different embodiments can be appropriately combined. Various modifications and applications are possible without departing from the gist of the invention.

Second Embodiment

An imaging system according to a second embodiment of the present invention will be described below with reference to FIG. 9 to FIGS. 14A, 14B, and 14C.

In the second embodiment, a description will be given mainly of the differences from the first embodiment, and identical reference symbols are given to similar parts and a description thereof will be omitted.

Figure 9:
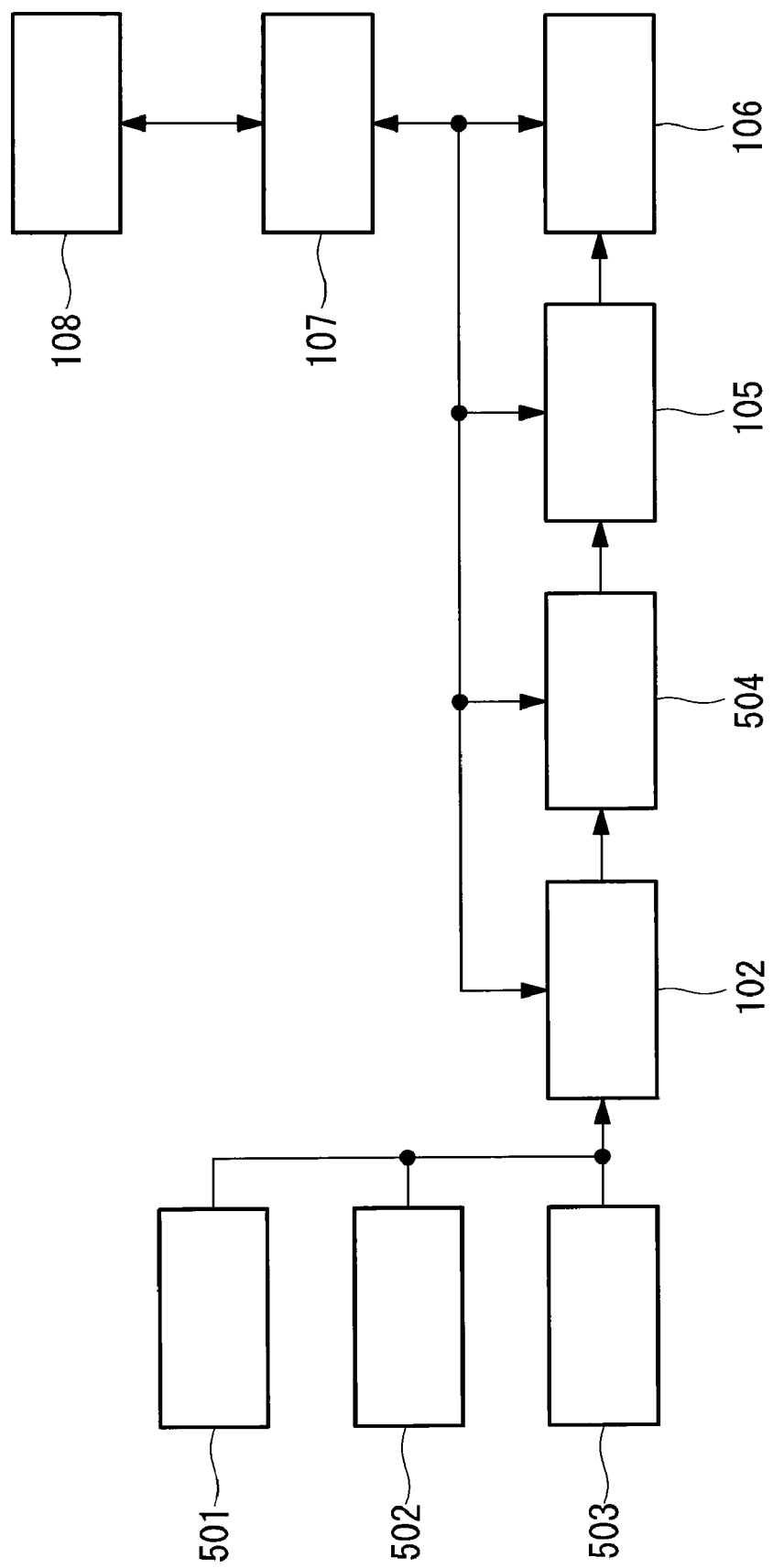
FIG. 9 is a schematic configuration diagram showing the entire configuration of an imaging system according to a second embodiment of the present invention.
Figure 10:
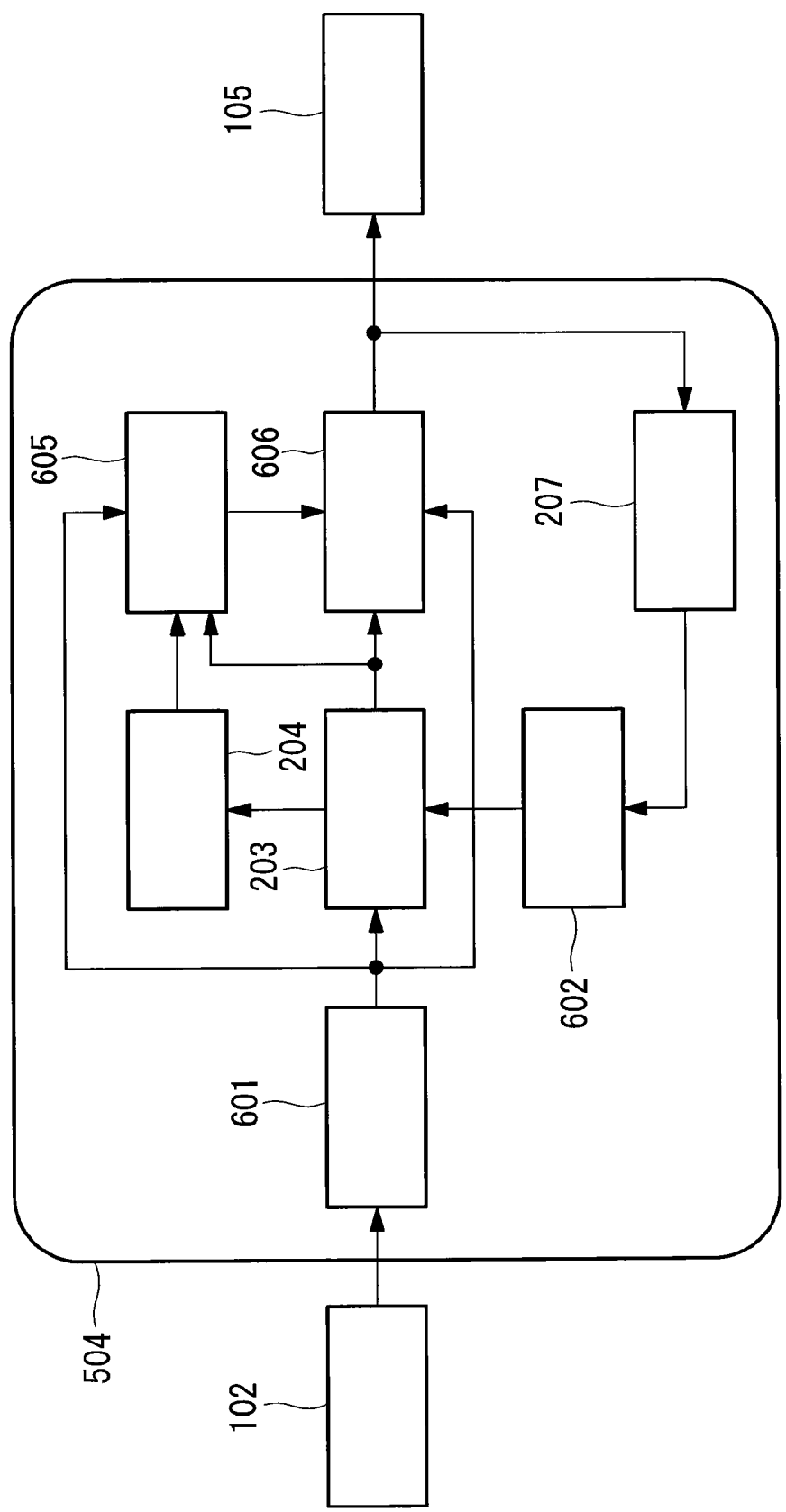
FIG. 10 is a block configuration diagram showing a noise reduction section of the imaging system shown in FIG. 9.
Figure 12:
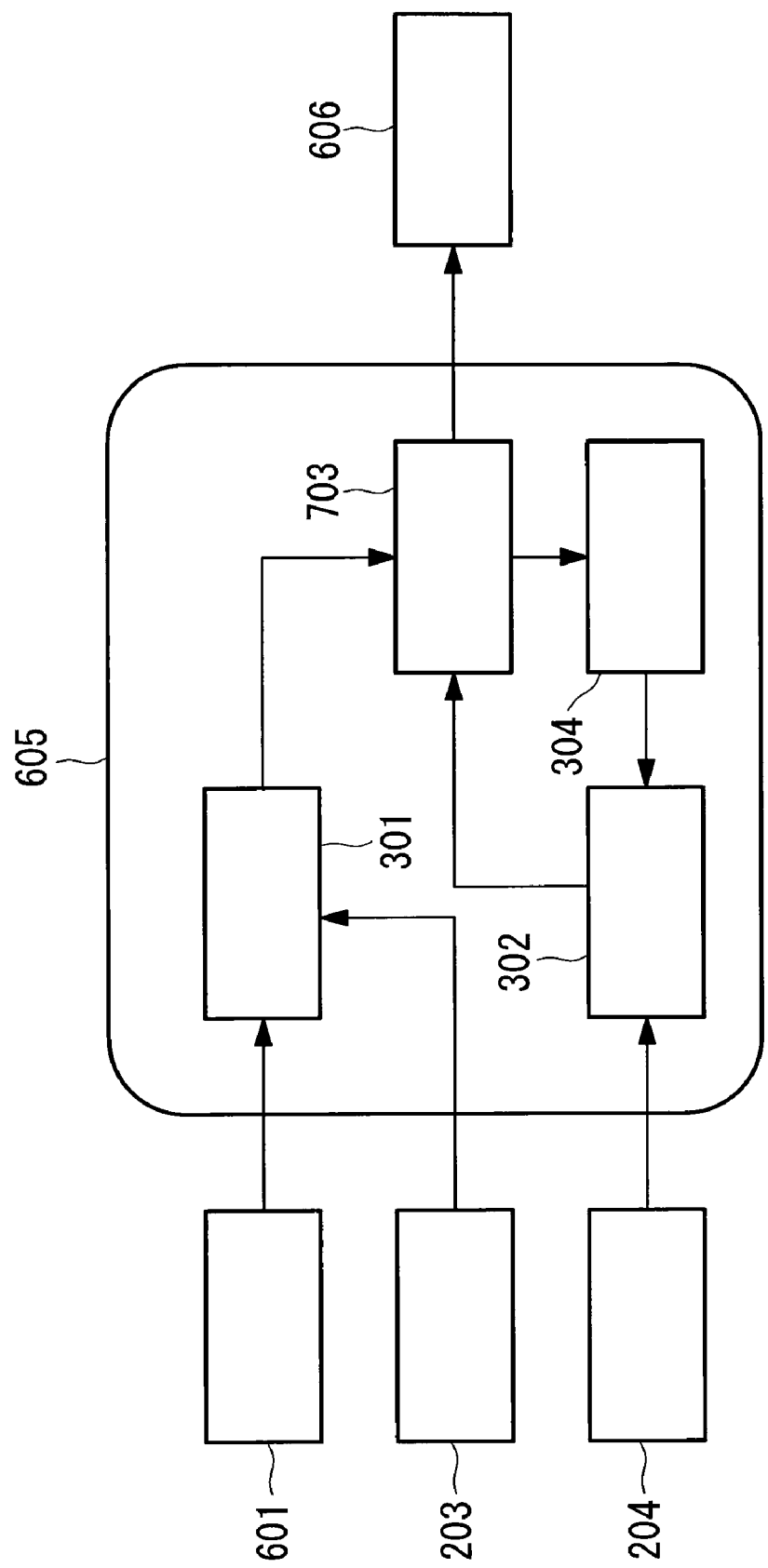
FIG. 12 is a block configuration diagram showing a residual image detection section of the imaging system shown in FIG. 9.
Figure 14A:
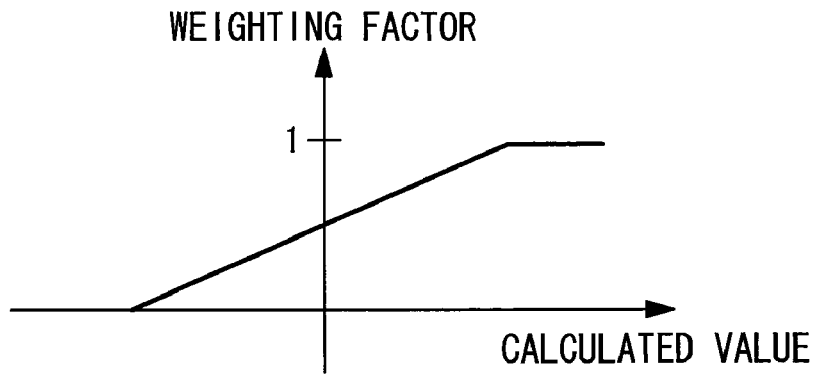
FIG. 14A is a graph showing the relationship between a weighting factor and a calculated value output from the residual image detection section in the imaging system shown in FIG. 9.
Figure 14B:
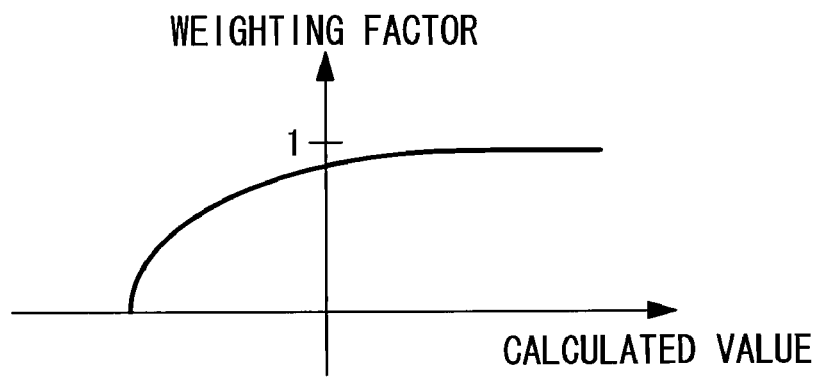
FIG. 14B is a graph showing the relationship between a weighting factor and a calculated value output from the residual image detection section in the imaging system shown in FIG. 9.
Figure 14C:
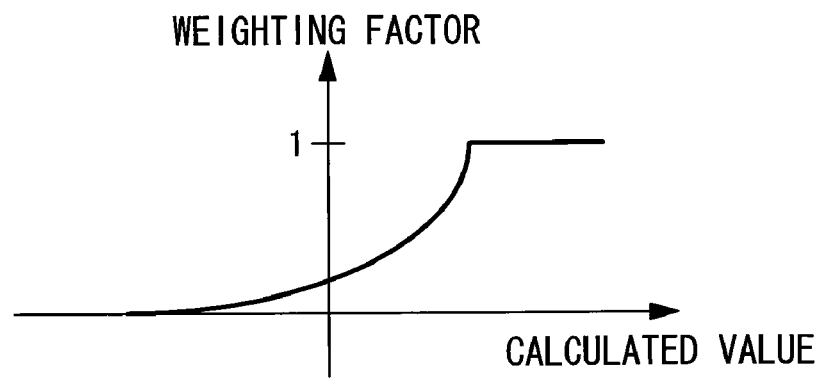
FIG. 14C is a graph showing the relationship between a weighting factor and a calculated value output from the residual image detection section in the imaging system shown in FIG. 9.

FIG. 9 is a schematic configuration diagram showing the entire configuration of an imaging system according to the second embodiment. FIG. 10 is a block configuration diagram showing a noise reduction section of the imaging system shown in FIG. 9. FIG. 11 is an explanatory diagram of the relationship between each of the arrays of RGB filters and local-region extraction. FIG. 12 is a block configuration diagram showing a residual image detection section of the imaging system shown in FIG. 9. FIG. 13 is a block configuration diagram showing a second noise reduction section of the imaging system shown in FIG. 9. FIGS. 14A, 14B, and 14C are graphs showing the relationship between a weighting factor and a calculated value output from the residual image detection section.

First, the flow of a signal in the imaging system shown in FIG. 9 according to this embodiment will be described.

The imaging system shown in FIG. 9 is obtained by partially modifying the imaging system shown in FIG. 1 according to the first embodiment.

Specifically, in the imaging system, the image pickup device 101, shown in FIG. 1, is replaced with an R image pickup device 501, a G image pickup device 502, and a B image pickup device 503; the noise reduction section 104 is replaced with a noise reduction section 504; and the Y/C separation section 103 is removed. The R image pickup device 501, the G image pickup device 502, and the B image pickup device 503 are provided with a dichroic prism for separating incident light flux into three color components of RGB. The other basic configurations are the same as those of the first embodiment, and identical names and reference symbols are assigned to the same configurations.

A description will be given below mainly of the differences. The dichroic prism separates light flux into three colors, RGB, and guides light having R components to the R image pickup device 501, light having G components to the G image pickup device 502, and light having B components to the B image pickup device 503. Thus, the R image pickup device 501, the G image pickup device 502, and the B image pickup device 503 each subject the light to photoelectric conversion and output it as an analog image signal. The R image pickup device 501, the G image pickup device 502, and the B image pickup device 503 are connected to the analog-to-digital converter 102.

Next, an example configuration of the noise reduction section 504 will be described with reference to FIG. 10.

The noise reduction section 504 shown in FIG. 10 is obtained by partially modifying the noise reduction section 104 shown in FIG. 3 according to the first embodiment. Specifically, in the noise reduction section 504, the Y/C separation section 103 shown in FIG. 3 is replaced with the analog-to-digital converter 102; the first region extraction section 201 shown in FIG. 3 is replaced with a first region extraction section 601; the second region extraction section 202 shown in FIG. 3 is replaced with a second region extraction section 602; the c detection section 205 shown in FIG. 3 is replaced with a residual image detection section 605; and the second noise reduction section 206 shown in FIG. 3 is replaced with a second noise reduction section 606. The other basic configurations are the same as those of the first embodiment, and identical names and reference symbols are assigned to the same configurations.

The analog-to-digital converter 102 is connected to the signal processing section 105 via the first region extraction section 601, the first noise reduction section 203, and the second noise reduction section 606. The first region extraction section 601 is also connected to the residual image detection section 605 and the second noise reduction section 606. The first noise reduction section 203 is also connected to the noise estimation section 204 and the residual image detection section 605.

The noise estimation section 204 is connected to the residual image detection section 605. The residual image detection section 605 is connected to the second noise reduction section 606. The second noise reduction section 606 is also connected to the frame memory 207. The frame memory 207 is connected to the first noise reduction section 203 via the second region extraction section 602.

Further, the control section 107 is bi-directionally connected to the first region extraction section 601, the second region extraction section 602, the first noise reduction section 203, the noise estimation section 204, the residual image detection section 605, and the second noise reduction section 606, and controls those sections.

From an image signal to be subjected to the noise reduction process, the first region extraction section 601 sequentially extracts a local region that includes a pixel of interest and adjacent pixels located adjacent to the pixel of interest, under the control of the control section 107, and outputs it to the first noise reduction section 203, the residual image detection section 605, and the second noise reduction section 606.

In this embodiment, it is assumed that the local region is formed of 5×5 pixels, as shown in FIG. 11. The pixel region is not limited to this, and any pixel region may be specified as a local region. For example, a square region formed of 3×3 pixels or a rectangular region formed of 7×5 pixels may be specified as a local region.

As another example, a square region formed of 4×4 pixels or a rectangular region formed of 4×6 pixels may be specified as a local region. In this case, since the center portion of the square region is formed of not one pixel but a plurality of pixels, one of the pixels serves as the pixel of interest. The size of a local region may be specified in advance according to a user instruction.

From a past image signal that has been subjected to the noise reduction process and that is stored in the frame memory 207, the second region extraction section 602 sequentially extracts a local region that includes a pixel located in the same spatial position as the pixel of interest shown in FIG. 11, and adjacent pixels located adjacent to that pixel, under the control of the control section 107, and outputs it to the first noise reduction section 203.

Under the control of the control section 107, the second noise reduction section 606 performs a two-dimensional noise reduction process by using RGB signal values of the pixel of interest output from the first region extraction section 601, noise-reduced RGB signal values of the pixel of interest output from the first noise reduction section 203, and calculated values output from the residual image detection section 605. The second noise reduction section 606 outputs RGB signal values of the pixel of interest that are obtained after the two-dimensional noise reduction process to the signal processing section 105 and the frame memory 207.

Next, the detailed configuration of the residual image detection section 605 will be described with reference to FIG. 12.

The residual image detection section 605 shown in FIG. 12 is obtained by partially modifying the residual image detection section 205 shown in FIG. 5 according to the first embodiment. Specifically, in the residual image detection section 605, the judgment section 303 shown in FIG. 5 is replaced with a judgment section 703. The other basic configurations are the same as those of the first embodiment, and identical names and reference symbols are assigned to the same configurations.

Under the control of the control section 107, the judgment section 703 compares the absolute difference signal values output from the calculation section 301 with the adjusted estimated amounts of noise output from the adjustment section 302, to judge whether residual image components are included in the noise-reduced RGB signals. The difference values between the absolute difference signal values and the adjusted estimated amounts of noise are calculated. When the absolute difference signal values are larger than the adjusted estimated amounts of noise, the calculated values become positive. When the absolute difference signal values are smaller than the adjusted estimated amounts of noise, the calculated values become negative.

When the calculated values are positive, it is judged that residual image components are included in the signal subjected to the three-dimensional noise reduction process, and judgment results, indicating whether residual image components are included in the pixel of interest, are set to indicate that "residual image components are included". On the other hand, when the calculated values are negative, it is judged that residual image components are not included in the signal subjected to the three-dimensional noise reduction process, and judgment results are set to indicate that "residual image components are not included". The calculated values are output to the second noise reduction section 606. The judgment results are output to the judgment-result storage section 304.

Next, the detailed configuration of the second noise reduction section 606 will be described with reference to FIG. 13.

Under the control of the control section 107, a two-dimensional noise reduction section 801 performs the two-dimensional noise reduction process based on the local region that includes the pixel of interest, transferred from the first region extraction section 601.

In this embodiment, it is assumed that a nonlinear filter is used in which, with respect to the pixel of interest and adjacent pixels, weighted addition is performed with a large weight being assigned to an adjacent pixel that is spatially close to the pixel of interest and with a small weight being assigned to an adjacent pixel that is spatially far from the pixel of interest; and further, weighted addition is performed with a large weight being assigned to an adjacent pixel having a value close to that of the pixel of interest and with a small weight being assigned to an adjacent pixel having a value far from that of the pixel of interest. The two-dimensional noise reduction section 801 outputs RGB signals $NR2s$ ($s=r, g, b$) of the pixel of interest that are obtained after the two-dimensional noise reduction process, to a combining section 803.

Under the control of the control section 107, a factor calculation section 802 specifies weighting factors $Ks$ ($s=r, g, b$) for the RGB signals based on the calculated values transferred from the residual image detection section 605.

When the calculated values for the pixel of interest are positive, the weighting factors $Ks$ are made larger. On the other hand, when the calculated values for the pixel of interest are negative, the weighting factors $Ks$ are made smaller. FIGS. 14A, 14B, and 14C show examples of the relationship between the calculated value and the weighting factor $Ks$.

Under the control of the control section 107, the combining section 803 combines the RGB signal values of the pixel of interest that are transferred from the two-dimensional noise reduction section 801 and the RGB signal values $NRs$ ($s=r, g, b$) of the pixel of interest that are transferred from the first noise reduction section 203, based on the weighting factors $Ks$ ($s=r, g, b$) output from the factor calculation section 802. Output signal values $NR3s$ ($s=r, g, b$) are given by Expression 4.

$$NR3r = Kr \times NR2r + (1-Kr) \times NRr$$

$$NR3g = Kg \times NR2g + (1-Kg) \times NRg$$

$$NR3b = Kb \times NR2b + (1-Kb) \times NRb \qquad \text{[Expression 4]}$$

Note that a description has been given of an image pickup apparatus in which image pickup parts, such as the R image pickup device 501, the G image pickup device 502, the B image pickup device 503, and the analog-to-digital converter 102, are integrated, as an example of a video signal processing apparatus; however, the video signal processing apparatus is not limited to this configuration. For example, a configuration may be used in which a video signal captured by a separately provided image pickup part is recorded in a recording medium, such as a memory card, as unprocessed raw data; accompanying information, such as image pickup conditions and data obtained at the time of image pickup, is also recorded in the recording medium as header information; and the information recorded in the recording medium is read and processed by the video signal processing apparatus.

When the video signal processing apparatus has a separately provided image pickup part, transmission of information to the video signal processing apparatus is not limited to that performed through a recording medium; it can, of course, be performed through wired or wireless communication lines.

Further, in the above description, it is assumed that the processing is performed by hardware; however, the way the processing is performed is not limited to this configuration. For example, a configuration may be used in which a signal transferred from the image pickup device 101 is output as unprocessed raw data together with header information, such as a configuration selected during capturing, the gain, and the amount of a change in luminance level, transferred from the control section 107; and the signal is processed in a computer by a video signal processing program serving as separate software.

According to this embodiment, when it is judged that residual image components are included in the image signal of the pixel of interest that has been subjected to the three-dimensional noise reduction process, the factor calculation section 802 specifies large weights for the two-dimensional noise reduction process, thereby making it possible to obtain a high-definition image in which residual image components are suppressed and the occurrence of a discontinuity caused by the noise reduction process is prevented.

What is claimed is:

1. An imaging system that applies noise reduction processing to image signals captured in time series via an image pickup block, comprising:
    a first extraction section that extracts a local region that includes a pixel of interest from an image signal to be processed;
    a second extraction section that extracts, from another image signal captured at a different time from the image signal to be processed, a local region including at least one of a pixel located in a same spatial position as the pixel of interest, and an adjacent pixel located adjacent to the same spatial position as the pixel of interest;
    a first noise reduction section that applies a first noise reduction process to the local region extracted by the first extraction section, by using the local region extracted by the second extraction section;
    a noise estimation section that estimates an amount of noise included in the pixel of interest based on the local region that has been subjected to the first noise reduction process in the first noise reduction section;
    a residual image detection section that detects a residual image component included in the local region that has been subjected to the first noise reduction process and that is output from the first noise reduction section, based on the amount of noise estimated by the noise estimation section; and
    a second noise reduction section that performs a second noise reduction process on the pixel of interest based on the residual image component detected by the residual image detection section.

2. An imaging system according to claim 1, wherein the residual image detection section comprises:
    a calculation section that calculates an absolute value of a difference between the pixel of interest and the local region that has been subjected to the first noise reduction process in the first noise reduction section; and
    a judgment section that compares the absolute value of the difference calculated by the calculation section with the amount of noise estimated by the noise estimation section, to judge whether a residual image component is included in the pixel of interest.

3. An imaging system according to claim 2, wherein the residual image detection section further comprises an adjustment section that adjusts the amount of noise based on a judgment result for a neighborhood of the pixel of interest.

4. An imaging system according to claim 3, wherein the adjustment section adjusts the estimated amount of noise to make it smaller when a residual image component is included in the neighborhood of the pixel of interest.

5. An imaging system according to claim 2, wherein the second noise reduction section comprises:
    a substitution section that substitutes the values of the local region output from the first noise reduction section into the values of the pixel of interest of the image signal to be processed, based on a detection result output from the residual image detection section; and
    a two-dimensional noise reduction section that applies the second noise reduction process to the local region that includes the pixel of interest in the image signal, substituted by the substitution section, based on a judgment result output from the judgment section.

6. An imaging system according to claim 1, wherein the second noise reduction section comprises:
    a two-dimensional noise reduction section that applies the second noise reduction process to the local region, which includes the pixel of interest, extracted by the first extraction section;
    a factor calculation section that calculates weighting factors for the image signal to be processed and for the local region that has been subjected to the first noise reduction process in the first noise reduction section, based on the residual image component detected by the residual image detection section; and
    a combining section that multiplies the local region that has been subjected to the second noise reduction process in the two-dimensional noise reduction section and the local region that has been subjected to the first noise reduction process in the first noise reduction section, by the factors calculated by the factor calculation section, and combines them.

7. An image processing method of applying noise reduction processing to image signals captured in time series by an image pickup block, comprising:
    a first step of extracting a local region that includes a pixel of interest from an image signal to be processed;
    a second step of storing a predetermined number of image signals;
    a third step of extracting, from another image signal captured at a different time from the image signal to be processed, a local region including at least one of a pixel located in a same spatial position as the pixel of interest, and an adjacent pixel located adjacent to the same spatial position as the pixel of interest;
    a fourth step of applying a first noise reduction process to the local region extracted in the first step, by using the local region extracted in the third step;

a fifth step of estimating an amount of noise included in the pixel of interest based on the local region that has been subjected to the first noise reduction process in the fourth step;

a sixth step of detecting a residual image component included in the local region that has been subjected to the first noise reduction process in the fourth step, based on the amount of noise estimated in the fifth step; and a seventh step of performing a second noise reduction process on the pixel of interest based on the residual image component detected in the sixth step.

8. A non-transitory computer-readable storage medium having stored thereon an image processing program for causing a computer to apply noise reduction processing to image signals captured in time series by an image pickup block, the image processing program causing the computer to execute processes comprising:

a first process of extracting a local region that includes a pixel of interest from an image signal to be processed;

a second process of storing a predetermined number of image signals;

a third process of extracting, from another image signal captured at a different time from the image signal to be processed, a local region including at least one of a pixel located in a same spatial position as the pixel of interest, and an adjacent pixel located adjacent to the same spatial position as the pixel of interest;

a fourth process of applying a first noise reduction process to the local region extracted in the first process, by using the local region extracted in the third process;

a fifth process of estimating an amount of noise included in the pixel of interest based on the local region that has been subjected to the first noise reduction process in the fourth process;

a sixth process of detecting a residual image component included in the local region that has been subjected to the first noise reduction process in the fourth process, based on the amount of noise estimated in the fifth process; and a seventh process of performing a second noise reduction process on the pixel of interest based on the residual image component detected in the sixth process.

9. An imaging system according to claim 1, wherein the first noise reduction section comprises a processing part in which weighted addition is applied with a large weight being assigned to an adjacent pixel of the pixel of interest having a pixel value close to that of the pixel of interest, and with a small weight being assigned to an adjacent pixel of the pixel of interest having a pixel value far from that of the pixel of interest.

10. An imaging system according to claim 2, wherein the judgment section judges that the residual image component is included when the absolute value is larger than the amount of noise.

11. An imaging system according to claim 5, wherein the first noise reduction section comprises a processing part in which weighted addition is applied with a large weight being assigned to an adjacent pixel of the pixel of interest having a pixel value close to that of the pixel of interest, and with a small weight being assigned to an adjacent pixel of the pixel of interest having a pixel value far from that of the pixel of interest.

12. An imaging system according to claim 11, wherein the two-dimensional noise reduction section comprises a processing part in which weighted addition is performed with a large weight being assigned to an adjacent pixel of the pixel of interest when the judgment section judges that the residual image component is included.

13. An imaging system according to claim 6, wherein the factor calculation section calculates the weighting factors such that a factor to be multiplied by the local region that has been subjected to the first noise reduction process in the first noise reduction section in a case in which the residual image detection section judges that the residual image component is included in the local region that has been subjected to the first noise reduction process in the first noise reduction section, is smaller than a factor to be multiplied by the local region that has been subjected to the first noise reduction process in the first noise reduction section in a case in which the residual image detection section judges that the residual image component is not included in the local region that has been subjected to the first noise reduction process in the first noise reduction section.

14. An imaging system according to claim 6, wherein the first noise reduction section comprises a processing part in which weighted addition is applied with a large weight being assigned to an adjacent pixel of the pixel of interest having a pixel value close to that of the pixel of interest, and with a small weight being assigned to an adjacent pixel of the pixel of interest having a pixel value far from that of the pixel of interest.

15. An imaging system according to claim 14, wherein the two-dimensional noise reduction section comprises a processing part in which weighted addition is performed with a large weight being assigned to an adjacent pixel of the pixel of interest when the judgment section judges that the residual image component is included.

* * * * *